(12) United States Patent
Takebayashi et al.

(10) Patent No.: US 12,398,287 B2
(45) Date of Patent: Aug. 26, 2025

(54) INK JET RECORDING METHOD AND INK JET RECORDING APPARATUS

(71) Applicant: CANON KABUSHIKI KAISHA, Tokyo (JP)

(72) Inventors: Satoshi Takebayashi, Tokyo (JP); Yoshitaka Torisaka, Tokyo (JP); Ryo Tsujii, Tokyo (JP); Nao Ishijima, Kanagawa (JP); Yuko Negishi, Tokyo (JP); Eiichi Nakata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 18/514,361

(22) Filed: Nov. 20, 2023

(65) Prior Publication Data

US 2024/0182741 A1 Jun. 6, 2024

(30) Foreign Application Priority Data

Nov. 25, 2022 (JP) .................... 2022-187861
Nov. 25, 2022 (JP) .................... 2022-187867
Nov. 7, 2023 (JP) .................... 2023-190124

(51) Int. Cl.
| | | |
|---|---|---|
| *C09D 11/54* | (2014.01) | |
| *B41M 3/00* | (2006.01) | |
| *C09D 11/033* | (2014.01) | |
| *C09D 11/037* | (2014.01) | |
| *C09D 11/102* | (2014.01) | |
| *C09D 11/322* | (2014.01) | |
| *C09D 11/38* | (2014.01) | |

(52) U.S. Cl.
CPC .............. *C09D 11/54* (2013.01); *B41M 3/001* (2013.01); *C09D 11/033* (2013.01); *C09D 11/037* (2013.01); *C09D 11/102* (2013.01); *C09D 11/322* (2013.01); *C09D 11/38* (2013.01)

(58) Field of Classification Search
CPC .............................. C09D 11/54; B41M 5/0017
See application file for complete search history.

(56) References Cited

U.S. PATENT DOCUMENTS

| | | | |
|---|---|---|---|
| 2008/0055385 A1 | 3/2008 | Houjou | |
| 2021/0062029 A1 | 3/2021 | Seguchi | |
| 2024/0043712 A1* | 2/2024 | Sato | ........ C09D 11/54 |

FOREIGN PATENT DOCUMENTS

| | | |
|---|---|---|
| JP | 2018165029 A | 10/2018 |
| JP | 2019147339 A | 9/2019 |
| JP | 2019155852 A | 9/2019 |
| JP | 2019157064 A | 9/2019 |
| JP | 2021030613 A | 3/2021 |
| JP | 2022186629 A | 12/2022 |

* cited by examiner

*Primary Examiner* — Julian D Huffman
(74) *Attorney, Agent, or Firm* — Canon U.S.A., Inc. IP Division

(57) ABSTRACT

There is provided an ink jet recording method for recording an image on a recording medium with an aqueous ink and an aqueous reaction liquid containing a reactant that reacts with the aqueous ink. The aqueous ink contains a pigment dispersed by the action of a carboxylic acid group, a resin particle and a water-soluble organic solvent. The rate of increase in the particle size of the pigment dispersed by the action of the carboxylic acid group when the pigment comes into contact with the aqueous reaction liquid is 8.0 times or more. The amount of water absorbed by the recording medium from the start of contact to 30 msec$^{1/2}$ in a Bristow method is 10 mL/m$^2$ or less.

24 Claims, 2 Drawing Sheets

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, ink jet recording methods have been increasingly used in a field called sign and display, such as the printing of posters and large-format advertisements. Ink jet recording apparatuses used in this field can be characterized in that they have a wider recording area than ink jet recording apparatuses for home use. In addition, images need to attract attention; thus, inks that can record an image having high color development are required.

In the field of sign and display, non-absorbent recording media whose surfaces have substantially no ink absorbency and which are composed of, for example, vinyl chloride (PVC) or polyethylene terephthalate (PET) are often used. Thus, it is necessary to inhibit the blurring of an image on a non-absorbent recording medium. Hereinafter, a recording medium whose surface has substantially no ink absorbency is also referred to as a "non-absorbent recording medium". In an ink jet recording method of recording on a non-absorbent recording medium, it is important to inhibit blurring by inhibiting ink dots from being repelled on the recording medium. For this purpose, it is necessary to rapidly thicken and fix the ink after the ink is applied to the recording medium.

As a method of recording on a non-absorbent recording medium, a recording method is known in which a solvent-based ink containing an organic solvent as a main component or a curable ink containing a polymerizable monomer is used. From the viewpoints of environmental impact and safety, there has recently been an increasing need for a recording method in which recording can be performed on a non-absorbent recording medium using an aqueous ink.

Examples of methods of recording on non-absorbent recording media using aqueous ink include a method in which water in the ink evaporates on a surface of a non-absorbent recording media; and a method in which a reaction liquid is used to aggregate the components of the ink. The former is advantageous from the viewpoint of running cost because it is not necessary to provide a unit configured to apply a reaction liquid, but is inferior in productivity because it is necessary to reduce the printing speed. For this reason, a method using a reaction liquid has been studied.

Some recording media have glossy surfaces. Such recording media are also required to have high image clarity from the viewpoint of recording high-quality images. The term "image clarity" refers to the sharpness of an image when the image is projected on the surface of a recorded image. When the image clarity is low, the image appears blurred. When the image clarity is high, the image appears clear. In sign-and-display applications, recorded images are displayed in various environments including outdoor environments and indoor environments; thus, environmental resistance is also important. Specifically, there is a problem with "moisture absorption resistance", that is, for example, when images are displayed in humid environments, images absorb moisture to reduce their lightness.

To obtain an image having high gloss using an aqueous reaction liquid, an ink jet recording method in which the amount of reaction liquid applied can be reduced, as described in Japanese Patent Laid-Open No. 2018-165029, and an ink composition to which a resin having a low aggregation property with respect to a reaction liquid is added, as described in Japanese Patent Laid-Open No. 2019-157064, have been proposed. As described in Japanese Patent Laid-Open No. 2019-155852, an ink jet recording method using a clear ink containing no coloring material in combination has been proposed in order to obtain an image having excellent scratch resistance and high image quality. As described in Japanese Patent Laid-Open Nos. 2021-030613 and 2019-147339, an ink jet recording method in which the aggregation property of an ink with respect to a reaction liquid is adjusted has been proposed. As described in Japanese Patent Laid-Open No. 2022-186629, a treatment liquid (reaction liquid) and an ink set that are used for controlling the maximum tensile stress of an ink film and that have excellent image fixability have been proposed in order to record an image in which blurring and cracking of the image are inhibited.

The inventors have conducted studies on various types of performance of recorded images with respect to ink jet recording methods described in Japanese Patent Laid-Open Nos. 2018-165029, 2019-155852, 2021-030613 and 2019-147339, and an ink composition described in Japanese Patent Laid-Open No. 2019-157064, and an ink set described in Japanese Patent Laid-Open No. 2022-186629. With regard to an image recorded by the ink jet recording method described in Japanese Patent Laid-Open No. 2018-165029 and an image recorded using the ink set described in Japanese Patent Laid-Open No. 2022-186629, the blurring of the images was not inhibited. With regard to an image recorded by preparing an ink using the ink composition described in Japanese Patent Laid-Open No. 2019-157064 and images recorded by the ink jet recording methods described in Japanese Patent Laid-Open Nos. 2019-155852, 2021-030613 and 2019-147339, the recorded images had image clarity to some extent but insufficient moisture absorption resistance.

SUMMARY OF THE INVENTION

The present invention provides an ink jet recording method by which an image excellent in image clarity and moisture absorption resistance with blurring inhibited can be recorded even when recording is performed on a non-absorbent recording medium. The present invention also provides an ink jet recording apparatus for use in the ink jet recording method.

One aspect of the present invention is directed to providing an ink jet recording method for recording an image on a recording medium with an aqueous ink and an aqueous reaction liquid containing a reactant that reacts with the aqueous ink. The method includes a reaction liquid application step of applying the aqueous reaction liquid to the recording medium and an ink application step of applying the aqueous ink in such a manner that the aqueous ink overlaps with at least part of a region of the recording medium to which the aqueous reaction liquid is applied. The aqueous ink contains a pigment dispersed by the action of a carboxylic acid group, a resin particle and a water-soluble organic solvent. The rate of increase in the particle size of the pigment dispersed by the action of the carboxylic acid group when the pigment comes into contact with the aqueous reaction liquid is 8.0 times or more. The resin particle contains a first resin particle having a rate of increase in particle size of 3.0 times or less when the first resin particle comes into contact with the aqueous reaction liquid. The mass ratio of the amount (% by mass) of the first resin particle contained to the total of the amount (% by mass) of a second resin particle having a rate of increase in particle size of more than 3.0 times when the second resin particle comes into contact with the aqueous reaction liquid and the amount (% by mass) of the pigment dispersed by the action of the carboxylic acid group contained in the aqueous ink is 1.2 times or more to 25.0 times or less. The water-soluble organic solvent contains a first water-soluble organic solvent having a vapor pressure of $1.0 \times 10^2$ kPa or more. The proportion (% by mass) of the first water-soluble organic solvent in the water-soluble organic solvent of the aqueous ink is 50.0% by mass or more. The amount of water absorbed by the recording medium from the start of contact to 30 $msec^{1/2}$ in a Bristow method is 10 $mL/m^2$ or less.

Further features of the present invention will become apparent from the following description of exemplary embodiments with reference to the attached drawings.

DESCRIPTION OF THE EMBODIMENTS

Figure 1:
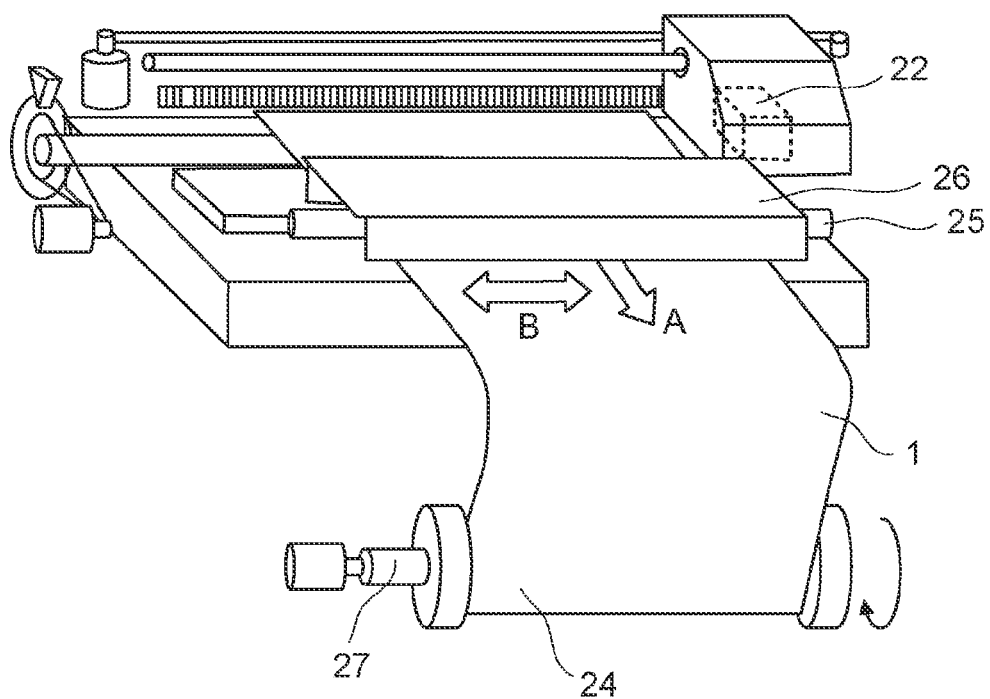
FIG. 1 is a schematic perspective view illustrating an ink jet recording apparatus according to an embodiment of the present invention.

The present invention will be described in more detail below with reference to embodiments. In an embodiment of the present invention, when a compound is a salt, the salt is dissociated into ions in the ink, but for convenience, it is expressed as "containing a salt". An aqueous ink and an aqueous reaction liquid for ink jet recording are also referred to simply as an "ink" and a "reaction liquid", respectively. The physical property values are values at room temperature (25° C.) and normal pressure (1 atm) unless otherwise specified. The term "(meth)acrylic acid" includes acrylic acid and methacrylic acid. The term "(meth)acrylate" includes an acrylate and a methacrylate.

As described in Japanese Patent Laid-Open Nos. 2018-165029 and 2019-157064, the inventors have conducted studies on the reason why image clarity and the inhibition of image blurring cannot be achieved at the same time when a reaction liquid is used. The reaction liquid contains a reactant that reacts with a component, such as a pigment or a resin, in the ink to aggregate the component. Thus, when the reaction liquid and the ink come into contact with each other on the surface of the non-absorbent recording medium, the component of the ink is rapidly aggregated as described above to record an image. At this time, the component rapidly aggregated by the reactant is likely to form irregularities as an aggregate on the surface of the non-absorbent recording medium, thereby deteriorating the smoothness of the image surface and the image clarity of the image.

To improve the smoothness of the image surface, the reactivity between the reactant and the component of the ink can be adjusted in such a manner that the aggregate is not easily formed. When the reactivity is lowered so as not to easily form the aggregate, the component of the ink is not reliably fixed to the surface of the recording medium, thereby failing to record a high-quality image. In particular, in an image to which a large amount of ink is applied, even a slight movement of the component of the ink is visually recognized as blurring. It is thus difficult to obtain image clarity and the inhibition of image blurring at the same time by a method in which the amount of reaction liquid applied is adjusted as described in Japanese Patent Laid-Open No. 2018-165029 or a method in which a component is added to adjust reactivity with the reaction liquid as described in Japanese Patent Laid-Open No. 2019-157064.

The inventors have conducted studies on the following configuration in order to achieve both image clarity and the inhibition of image blurring. The inventors have conducted studies on the use of a pigment having high reactivity with a reactant in a reaction liquid in order to inhibit image blurring and the use of a resin particle having low reactivity with a reactant in order to improve image clarity of an image. The resulting image, however, had insufficient image clarity. This is presumably because, although the reactivity of the resin particle with the reactant was lowered, the pigment had high reactivity with the reactant, thereby forming an aggregate to fail to sufficiently improve the smoothness.

The inventors have conducted studies to adjust the ratio of a resin particle to a pigment and have found that when the ratio of the resin particle to the pigment is in a certain range, both image clarity and the inhibition of image blurring can be achieved. It has been found that although the adjustment of the ratio of the resin particle to the pigment enables the achievement of both image clarity and the inhibition of image blurring, a new problem described below arises when the resulting image is displayed for a long period of time. Specifically, when the resulting image was displayed for a long period of time, a phenomenon occurred in which a large number of small droplets adhered to the surface of the image, deteriorating color development. Hereinafter, this issue is referred to as "moisture absorption resistance".

The inventors have analyzed the cause of the phenomenon in which a large number of small droplets adhere to the surface of an image during long-term display and have found that the liquid component of the reaction liquid or the ink applied to the non-absorbent recording medium remain inside the image even when the surface of the image is apparently dried, and the remaining liquid component attracts water vapor in the air to form droplets during long-term display. The inventors have also found that a deterioration in color development due to the adhesion of the droplets does not occur when a pigment having high reactivity and a resin particle having high reactivity are used, and a significant deterioration in color development occurs when a pigment having high reactivity and a resin particle having low reactivity are used.

The inventors have speculated that the cause of a deterioration in moisture absorption resistance is as follows. The non-absorbent recording medium hardly absorbs the liquid component; thus, the liquid component in the reaction liquid or the ink hardly permeates into the recording medium, and even when the image is dried by heating or the like, the liquid component remains partially inside the image. The remaining liquid component has a high affinity for water vapor in air. When the pigment and the resin particle have high reactivity, an aggregate formed is bulky and has a large number of gaps. Thus, the liquid component remaining inside the image gradually evaporates while the image is displayed. However, the resin particle having low reactivity does not easily aggregate. The resin particle spreads so as to fill the gaps between the aggregates of the pigment and is fixed on the recording medium. As a result, it is considered that the evaporation of the liquid component remaining inside the image is inhibited by the resin particle, and thus the liquid component attracts water vapor in air due to long-term display, thereby causing a phenomenon in which droplets adhere to the surface of the image.

Based on the above-described cause, the inventors have conducted studies on how to avoid leaving the liquid component inside the image as much as possible and have found that the moisture absorption resistance can be improved by setting the proportion of the water-soluble organic solvent having a high vapor pressure to a certain value or more.

That is, the ink jet recording method according to an embodiment of the present invention has the following features. An aqueous ink contains a pigment dispersed by the action of a carboxylic acid group, a resin particle and a water-soluble organic solvent. The rate of increase in the particle size of the pigment dispersed by the action of the carboxylic acid group when the pigment comes into contact with an aqueous reaction liquid is 8.0 times or more. The resin particle contains a first resin particle having a rate of increase in particle size of 3.0 times or less when the first resin particle comes into contact with the aqueous reaction liquid. The mass ratio of the amount (% by mass) of first resin particle contained to the total of the amount (% by mass) of second resin particle having a rate of increase in particle size of more than 3.0 times when the second resin particle comes into contact with the aqueous reaction liquid and the amount (% by mass) of pigment dispersed by the action of the carboxylic acid group contained in the aqueous ink is 1.2 times of more to 25.0 times or less. The water-soluble organic solvent contains a first water-soluble organic solvent having a vapor pressure of $1.0 \times 10^{-2}$ kPa or more. The proportion (% by mass) of the first water-soluble organic solvent in the water-soluble organic solvent of the aqueous ink is 50.0% by mass or more. The amount of water absorbed by a recording medium from the start of contact to 30 $msec^{1/2}$ in a Bristow method is 10 $mL/m^2$ or less. The aqueous reaction liquid and the aqueous ink are applied to the recording medium so as to at least partially overlap each other. The inventors have speculated that the mechanism by which an image having excellent image clarity and moisture absorption resistance can be recorded by the above-described configuration while blurring is inhibited is as follows.

The ink contains the pigment dispersed by the action of the carboxylic acid group. For this reason, when the pigment comes into contact with a reaction liquid described below, the pigment reacts with a reactant in the reaction liquid by electrostatic interaction and aggregates. When a coloring material dispersed by the action of a nonionic group, such as an ethylene oxide group, or an anionic group other than the carboxylic acid group, the aggregation of the coloring material does not easily proceed, thus failing to inhibit image blurring.

The rate of increase in the particle size of the pigment dispersed by the action of the carboxylic acid group when the pigment comes into contact with the aqueous reaction liquid is 8.0 times or more. The "rate of increase in the particle size of the pigment" is an index of the ease of aggregation of the pigment when the pigment comes into contact with the reaction liquid. A larger value thereof indicates a higher aggregation property. The definition and measurement method of the "rate of increase in the particle size of the pigment" will be described below. In the case of the rate of increase in particle size of 8.0 times or more when the reaction liquid and the ink come into contact with each other on the recording medium, the reactivity of the pigment with the reactant is sufficiently high, and an image in which blurring is inhibited can be recorded. In the case of the rate of increase in particle size of less than 8.0 times, even when the reaction liquid and the ink come into contact with each other on the surface of the recording medium, the aggregation of the pigment does not sufficiently proceed, thereby failing to inhibit image blurring.

The ink contains the first resin particle having a rate of increase in particle size of 3.0 times or less when the first resin particle comes into contact with the reaction liquid. The "rate of increase in the particle size of the resin particle" is an index of the case of aggregation of the resin particle when the resin particle comes into contact with the reaction liquid. A larger value thereof indicates higher aggregation property. The definition and measurement method of the "rate of increase in the particle size of the resin particle" will be described below. In the case of the rate of increase in particle size of 3.0 times or less when the reaction liquid and the ink come into contact with each other on the recording medium, the reactivity of the resin particle with the reactant is sufficiently low, and an image having excellent image clarity can be recorded. Even if the ink contains a resin particle, the rate of increase in particle size of more than 3.0 times is likely to cause the aggregation of the resin particle when the reaction liquid and ink come into contact with each other on the surface of the recording medium, thereby failing to obtain the image clarity of the image. The mass ratio of the first resin particle content (% by mass) to the total of the amount (% by mass) of second resin particle having a rate of increase in particle size of more than 3.0 times and the amount (% by mass) of pigment dispersed by the action of the carboxylic acid group needs to be 1.2 times or more to 25.0 times or less. The amount (% by mass) of second resin particle contained in the ink may be 0% based on the total mass of the ink. The ink may be substantially free of the second resin particle. A mass ratio of less than 1.2 times results in a large amount of component having high reactivity with the reactant in the ink. Thus, the aggregate easily causes irregularities on the surface of the image, failing to obtain the image clarity of an image. A mass ratio of more than 25.0 times results in an excessively large amount of component having low reactivity with the reactant in the ink. The movement of the resin particle having low reactivity easily moves the pigment, thereby failing to inhibit image blurring.

The water-soluble organic solvent in the ink contains the first water-soluble organic solvent having a vapor pressure of $1.0 \times 10^{-2}$ kPa or more. The proportion (% by mass) of the first water-soluble organic solvent in the water-soluble organic solvent of the ink needs to be 50.0% by mass or more. The first water-soluble organic solvent evaporates easily in a normal environment, for example, at room temperature (25° C.) and normal pressure (1 atm). When the proportion of the first water-soluble organic solvent in the water-soluble organic solvent of the ink is within the above range, the liquid component can be less likely to remain inside the recorded image, thereby improving the moisture absorption resistance of an image.

Ink Jet Recording Method and Ink Jet Recording Apparatus

The ink jet recording method according to an embodiment of the present invention is a method in which the aqueous ink and the aqueous reaction liquid are discharged from a recording head of an ink jet system by the action of thermal energy and applied to a recording medium to record an image. The ink jet recording method according to an embodiment of the present invention includes a reaction liquid application step of applying the aqueous reaction liquid to the recording medium, and an ink application step of applying the aqueous ink in such a manner that the aqueous ink overlaps with at least part of a region of the recording medium to which the aqueous reaction liquid is applied. The aqueous ink contains the pigment dispersed by the action of the carboxylic acid group, the resin particle and the water-soluble organic solvent. The rate of increase in the particle size of the pigment dispersed by the action of the carboxylic acid group when the pigment comes into contact with the aqueous reaction liquid is 8.0 times or more. The resin particle contains the first resin particle having a rate of increase in particle size of 3.0 times or less when the first resin particle comes into contact with the aqueous reaction liquid. The mass ratio of the amount (% by mass) of first resin particle contained to the total of the amount (% by mass) of second resin particle having a rate of increase in particle size of more than 3.0 times when the second resin particle comes into contact with the aqueous reaction liquid and the amount (% by mass) of pigment dispersed by the action of the carboxylic acid group contained in the aqueous ink is 1.2 times or more to 25.0 times or less. The water-soluble organic solvent contains the first water-soluble organic solvent having a vapor pressure of $1.0 \times 10^{-2}$ kPa or more. The proportion (% by mass) of the first water-soluble organic solvent in the water-soluble organic solvent of the aqueous ink is 50.0% by mass or more. The aqueous reaction liquid contains the reactant that reacts with the aqueous ink. The amount of water absorbed by the recording medium from the start of contact to 30 $\text{msec}^{1/2}$ in the Bristow method is 10 $\text{mL/m}^2$ or less.

The ink jet recording apparatus according to an embodiment of the present invention is an apparatus for use in an ink jet recording method in which an aqueous ink and an aqueous reaction liquid are discharged from a recording head of an ink jet system by the action of thermal energy and applied to a recording medium to record an image. The apparatus can be used for the recording method. In the ink jet recording method and the ink jet recording apparatus according to embodiments of the present invention, it is not necessary to cure an image by irradiation with, for example, an activation energy ray.

The ink jet recording method and the ink jet recording apparatus according to embodiments of the present invention (hereinafter, also referred to simply as "the recording method and the recording apparatus") will be described in detail below.

Figure 2:
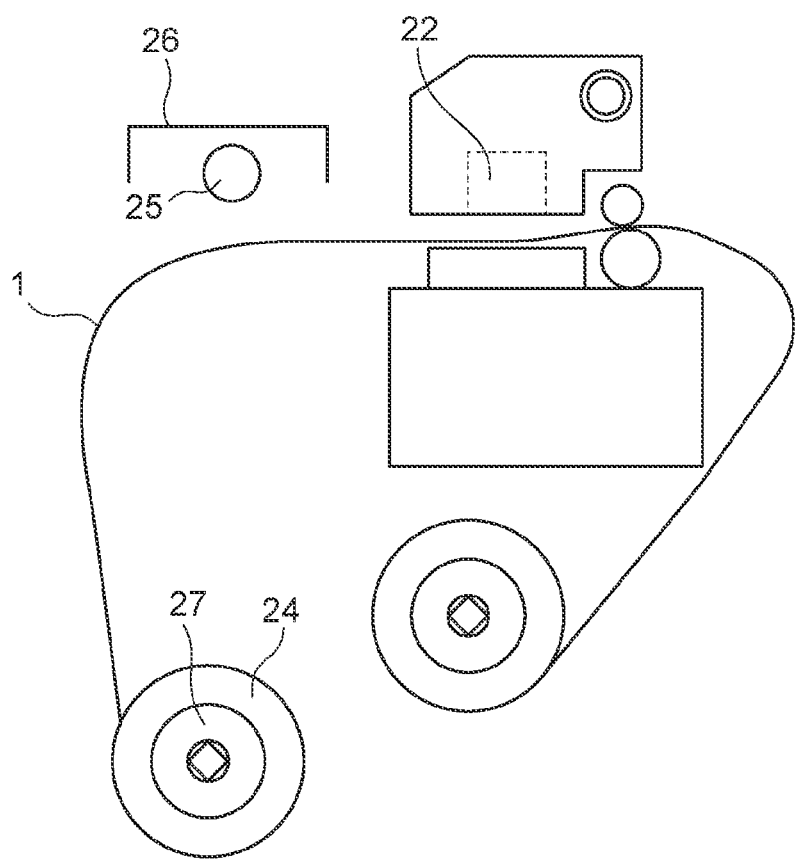
FIG. 2 is a schematic side view illustrating an ink jet recording apparatus according to an embodiment of the present invention.

FIG. 1 is a schematic perspective view illustrating an ink jet recording apparatus according to an embodiment of the present invention. FIG. 2 is a schematic side view illustrating an ink jet recording apparatus according to an embodiment of the present invention. As illustrated in FIGS. 1 and 2, the recording apparatus according to the present embodiment includes a recording head 22, configured to discharge ink, of an ink jet system. The recording head 22 is configured to discharge ink by the action of thermal energy. In a recording head configured to discharge ink by the action of thermal energy, an electric pulse is applied to an electrothermal conversion element to apply thermal energy to ink, thereby discharging the ink from a discharge port. Here, the recording head configured to discharge an ink by the action of thermal energy is given as an example. However, a recording head configured to discharge ink by the action of mechanical energy may be used. The recording head may include a mechanism (temperature control mechanism) configured to heat the aqueous ink discharged from the recording head. When the temperature control mechanism is provided, the temperature of the ink discharged from the recording head can be 35° C. or higher to 70° C. or lower.

Heating Step

The recording method according to an embodiment of the present invention may include a step of heating (heat-treating) the recording medium to which the ink (and the reaction liquid) has been applied. Heating the recording medium to which the ink has been applied can promote drying and increase the strength of the image.

Examples of a unit configured to heat the recording medium include heating units, such as known warming units, e.g., heaters; air-blowing units using air blowing, e.g., dryers; and units obtained by combining these units. Examples of heating units include the above-described warming units; air-blowing units; and units obtained by combining these. Examples of the heat treatment method include a method in which heat is applied with, for example, a heater from the side (back surface) opposite to the recording surface (ink application surface) of the recording medium; a method in which warm air or hot air is applied to the recording surface of the recording medium; and a method in which heating is performed with an infrared heater from the recording surface or the back surface. Furthermore, two or more of them may be combined together.

The heating temperature of the recording medium to which the ink has been applied can be 50° C. or higher to 90° C. or lower because the scratch resistance of the image can be enhanced. The heating temperature of the recording medium to which the ink has been applied may be read by a sensor incorporated at a position corresponding to the heating unit of the recording apparatus, or may be determined from the relationship between the amount of heat and the temperature of the recording medium, the relationship having been determined in accordance with the types of inks and recording media.

In the recording apparatus illustrated in FIGS. 1 and 2, a heater 25 supported by a frame (not illustrated) is disposed at a position on the downstream side in a sub-scanning direction A with respect to a position at which the recording head 22 performs reciprocating scanning in a main scanning direction B. The recording medium 1 to which the ink has been applied is heated by the heater 25. Examples of the heater 25 include sheathed heaters and halogen heaters. The heater 25 is covered with a heater cover 26. The heater cover 26 is a member for efficiently irradiating the recording medium 1 with beat generated from the beater 25. The heater cover 26 is also a member for protecting the heater 25. The recording medium 1 to which the ink discharged from the recording head 22 has been applied is wound by a winding spool 27 to form a roll-shaped wound medium 24.

Recording Medium

In the recording method and the recording apparatus according to embodiments of the present invention, a low-absorbent or non-absorbent recording medium (low- to non-absorbent recording medium) is used. The low- to non-absorbent recording medium is a recording medium in which the amount of water absorbed from the start of contact to 30 $\text{msec}^{1/2}$ is 0 $\text{mL/m}^2$ or more to 10 $\text{mL/m}^2$ or less in the Bristow method described in "Liquid Absorbent Test Method for Paper and Paperboard" of JAPAN TAPPI Paper and Pulp Test Method No. 51. In an embodiment of the present invention, a recording medium satisfying the requirement of the amount of water absorbed is defined as a "low to non-absorbent recording medium". Recording media, such as glossy paper and mat paper, for ink jet recording having a coating layer (ink-receiving layer) formed of an inorganic particle and plain paper having no coating layer are "absorbent recording media", in which the amount of water absorbed is more than 10 mL/m$^2$.

Examples of the low- to non-absorbent recording medium that can be used include a plastic film; a recording medium with a plastic film bonded to the recording surface side of a base material; and a recording medium with a resin coat layer provided on the recording surface of a base material containing cellulose pulp. Among these, the plastic film can be used. The recording medium with the resin coating layer provided on the recording surface of the base material containing cellulose pulp can also be used.

When the ink containing the resin particle is applied to a non-absorbent recording medium, components such as water and a water-soluble organic solvent evaporate to concentrate the resin particle. Fusion of the concentrated resin particle is promoted to improve the strength of an image recorded. In contrast, when the ink is applied to a recording medium having high absorbability of a liquid component, the fusion of the resin particle is less likely to be promoted, failing to improve the strength of an image. The recording medium in this specification indicates not a transfer body but a target recording medium on which an image is recorded as a recorded article.

Reaction Liquid

The recording method according to an embodiment of the present invention includes the reaction liquid application step of applying the aqueous reaction liquid containing the reactant that reacts with the aqueous ink to the recording medium. The reaction liquid application step can be performed before the ink application step. Alternatively, the ink application step and the reaction liquid application step can be performed simultaneously. Components and so forth used in the reaction liquid will be described in detail below.

Reactant

The reaction liquid reacts with the ink to aggregate a component, such as an anionic group-containing component, for example, a resin, a surfactant or a self-dispersible pigment, in the ink when the reaction liquid comes into contact with the ink. The reaction liquid contains a reactant. The presence of the reactant enables the destabilization of the state of presence of the component having an anionic group in the ink when the ink and the reactant come into contact with each other in the recording medium, thereby promoting the aggregation of the ink. Examples of the reactant include a polyvalent metal ion; a cationic component such as a cationic resin; and an organic acid. These reactants may be used alone or in combination of two or more.

Organic Acid

The organic acid-containing reaction liquid has a buffering ability in an acidic region (a pH of less than 7.0, preferably 2.0 to 5.0) and thus efficiently converts an anion group of a component present in the ink into an acid form to produce an aggregate. The pigment is dispersed by the action of the carboxylic acid group. When the pigment comes into contact with the organic acid, the pigment loses dispersibility, and aggregation proceeds. Examples of the organic acid include monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumaric acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts thereof and hydrogen salts thereof; tricarboxylic acids, such as citric acid and trimellitic acid, and salts thereof and hydrogen salts thereof; and tetracarboxylic acids, such as pyromellitic acid, and salts thereof and hydrogen salts thereof.

When an organic acid is used as the reactant, a polyvalent carboxylic acid can be used from the viewpoint of more effectively inhibiting image blurring. That is, the organic acid used as the reactant can be a polyvalent carboxylic acid. When a monocarboxylic acid having low water solubility is used as the reactant, the monocarboxylic acid is easily precipitated by, for example, the evaporation of a liquid component of the ink before application to a recording medium. For this reason, the action of converting the anionic group into an acid form is not sufficiently provided, in some cases. This may fail to sufficiently inhibit image blurring. When a monocarboxylic acid having high water solubility is used as the reactant, the action of converting the anionic group into an acid form cannot be sufficiently provided in some cases as described above because of the high volatility of the monocarboxylic acid itself. This may fail to sufficiently inhibit image blurring.

The organic acid can have an acid dissociation constant (pKa) of 5.0 or less at 25° C. pKa represents the ease of dissociation of a proton of an acid. When the organic acid has a plurality of anionic groups (carboxylic acid groups), the organic acid has a plurality of pKa values. However, it can be said that the amount of organic acid dissociated in the reaction liquid depends on a first acid dissociation constant (pKa$_1$), which represents the ease of dissociation of the proton of the acid in a first step. In this specification, the acid dissociation constant in the case of an organic acid having a plurality of anionic groups refers to the first acid dissociation constant. When the organic acid has a pKa of more than 5.0, the action of aggregating the pigment is weakened, and image blurring cannot be sufficiently inhibited in some cases. The organic acid can have a pKa of 0 or more at 25° C. from the viewpoint of reactivity with the resin particle. When the resin particle in the ink is a resin particle dispersed by the action of a carboxylic acid group, the organic acid preferably has a pKa of 3.2 or more at 25° C. More preferably, the organic acid has a pKa of 3.5 or more at 25° C. A pKa of the organic acid of less than 3.2 results in too strong action of aggregating the resin particle. This may fail to sufficiently obtain the image clarity of an image. The organic acid content (% by mass) of the reaction liquid is preferably 1.0% by mass or more to 10.0% by mass or less, more preferably 1.0% by mass or more to 5.0% by mass or less, based on the total mass of the reaction liquid.

The acid dissociation constant is defined as follows. For example, the ionization equilibrium of an acid represented by HA can be represented by HA⇌H$^+$+A$^-$. The equilibrium constant Ka is represented by Ka=[H$^+$]×[A]/[HA]. The acid dissociation constant pKa is the negative common logarithm of this equilibrium constant and is defined as pKa=−log$_{10}$ Ka. The acid dissociation constant (pKa) of the organic acid at 25° C. can be calculated by neutralization titration using a pH meter (for example, trade name "Metrohm 798, MPT Titrino", available from Metrohm) or the like.

Polyvalent Metal Salt

The polyvalent metal salt is a compound formed of a divalent or higher valent metal ion (polyvalent metal ion) and an anion. The polyvalent metal salt dissociates in the aqueous reaction liquid into a polyvalent metal ion, and aggregates the pigment dispersed by the action of the carboxylic acid group in the ink. The polyvalent metal salt may be a hydrate.

Examples of the polyvalent metal ion constituting the polyvalent metal salt include divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. Among these, at least one metal ion selected from the group consisting of $Ca^{2+}$ and $Mg^{2+}$ can be used from the viewpoint of the image clarity of an image.

Examples of the anion constituting the polyvalent metal salt include inorganic anions, such as $Cl^-$, $Br^-$, $ClO^-$, $ClO_2^-$, $ClO_3^-$, $ClO_4^{2-}$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $C_2H_5COO^-$, $CH_3CH(OH)COO^-$, $C_2H_4(COO^-)_2$, $C_6H_5COO^-$, $C_6H_4(COO^-)_2$ and $CH_3SO_3^-$. These polyvalent metal salts may be used alone or in combination of two or more. Among these, at least one compound selected from the group consisting of calcium lactate (a combination of $Ca^{2+}$ and $CH_3CH(OH)COO^-$) and magnesium sulfate (a combination of $Mg^{2+}$ and $SO_4^{2-}$) can be used as the polyvalent metal salt in the reaction liquid. The use of calcium lactate or magnesium sulfate enables a further improvement in image clarity of an image.

When the polyvalent metal ion is used as the reactant, the ion content (% by mass) of the reaction liquid in terms of the polyvalent metal salt can be 1.0% by mass or more to 20.0% by mass or less based on the total mass of the reaction liquid. In this specification, the "polyvalent metal salt content (% by mass)" of the reaction liquid when the polyvalent metal salt is a hydrate indicates the "anhydrous polyvalent metal salt content (% by mass)" excluding water as a hydrate.

Cationic Resin

The cationic resin has a cationic site in the structure of the resin, and aggregates the pigment dispersed by the action of the carboxylic acid group in the ink. Examples of the cationic resin include a resin having a structure of a primary to tertiary amine; and a resin having a structure of a quaternary ammonium salt. Specific examples thereof include resins each having a structure of, for example, vinylamine, allylamine, vinylimidazole, vinylpyridine, dimethylaminoethyl methacrylate, ethyleneimine, guanidine, diallyldimethylammonium chloride or an alkylamine-epichlorohydrin condensate. To increase the solubility in the reaction liquid, the cationic resin and an acidic compound may be used in combination, or the cationic resin may be subjected to quaternization treatment.

When the cationic resin is used as the reactant, the cationic resin preferably has a weight-average molecular weight of 500 or more to 10,000 or less. The weight-average molecular weight of the cationic resin can be measured, for example, by gel permeation chromatography in terms of pullulan. In particular, the cationic resin more preferably has a weight average molecular weight of 5,000 or less. A weight-average molecular weight of more than 5,000 may result in a too large aggregate with the component of the ink to fail to obtain sufficient image clarity of an image. The cationic resin content (% by mass) of the reaction liquid is preferably 0.1% by mass or more to 10.0% by mass or less, more preferably 0.1% by mass or more to 5.0% by mass or less, based on the total mass of the reaction liquid.

The cationic resin can have a degree of cationization of 3 meq/g or more to 7 meq/g or less. A degree of cationization of less than 3 meq/g may result in a reduction in the action of aggregating the pigment described below to fail to sufficiently inhibit image blurring. A degree of cationization of more than 7 meq/g may result in a reduction in the action of aggregating the resin particle described below to fail to obtain sufficient image clarity of an image. The degree of cationization is an index that indicates the degree of cationicity of the resin. A higher degree of cationization indicates a larger amount by mole of cationic group.

The degree of cationization of the cationic resin can be measured at 25° C. by colloid titration with an Automatic Potentiometric Titrator (trade name: AT-510, available from Kyoto Electronics Manufacturing Co., Ltd.) using a 1/400 N potassium polyvinyl sulfate solution (available from Fujifilm Corporation) as a titrant. The aqueous solution of the cationic resin used for the titration may be prepared by dissolving the cationic resin appropriately taken out from the reaction liquid in water.

Aqueous Medium

The reaction liquid is an aqueous reaction liquid containing at least water as an aqueous medium. The aqueous medium used in the reaction liquid can contain a water-soluble organic solvent that can be contained in the ink and that will be described below. The reaction liquid can further contain a second water-soluble organic solvent having a vapor pressure of $1.0 \times 10^{-2}$ kPa or more. The proportion (% by mass) of the second water-soluble solvent in the water-soluble organic solvent of the reaction liquid can be 90.0% by mass or more. A proportion of less than 90.0% by mass may result in an increase in the amount of liquid component remaining inside a recorded image to fail to provide sufficient moisture absorption resistance of an image. The proportion may be 100.0% by mass, that is, all of the water-soluble organic solvent in the reaction liquid may be the second water-soluble organic solvent. As the second water-soluble organic solvent, the same solvent as the first water-soluble organic solvent described below can be used. In this specification, the vapor pressure is a value at 25° C. and 1 atm.

Other Components

The reaction liquid may contain various other components, as needed. Examples of other components include the same components as other components that can be contained in the ink and that will be described below.

When the reaction liquid contains a resin particle described below, the resin particle content (% by mass) can be 1.0% by mass or less based on the total mass of the reaction liquid. A resin particle content of more than 1.0% by mass may result in the inhibition of the reactant from coming into contact with the component of the ink when the reaction liquid and the ink come into contact with each other on a recording medium, thereby failing to sufficiently inhibit image blurring. The resin particle content (% by mass) of the reaction liquid can be 0.0% by mass. That is, the reaction liquid can be substantially free of a resin particle.

Physical Properties of Reaction Liquid

The reaction liquid used in the recording method according to an embodiment of the present invention is an aqueous reaction liquid for use in an ink jet system. Accordingly, the physical property values can be appropriately controlled from the viewpoint of reliability. Specifically, the surface tension of the reaction liquid at 25° C. can be 20 mN/m or more to 60 mN/m or less. The viscosity of the reaction liquid at 25° C. can be 1.0 mPa·s or more to 10.0 mPa·s or less. The pH of the reaction liquid at 25° C. is preferably 5.0 or more to 9.5 or less, more preferably 6.0 or more to 9.0 or less.

Ink

The ink used in the recording method according to an embodiment of the present invention is an aqueous ink for ink jet recording, the aqueous ink containing a pigment dispersed by the action of a carboxylic acid group, a resin particle and a water-soluble organic solvent. Components and so forth contained in the ink will be described in detail below.

Pigment

The ink contains a pigment as a coloring material. The pigment is dispersed by the action of the carboxylic acid group, and aggregated by the reactant in the reaction liquid. The rate of increase in the particle size of the pigment dispersed by the action of the carboxylic acid group when the pigment comes into contact with the reaction liquid is 8.0 times or more. The rate of increase in particle size can be 50.0 times or less. The rate of increase in the particle size of the pigment is the rate of increase in the particle size of the pigment when the dispersion of the pigment dispersed by the action of the carboxylic acid group and the reaction liquid are mixed in a mass ratio of 1:1. Specifically, the rate is a value calculated by ($D_{50}$ of pigment after mixing with reaction liquid)/($D_{50}$ of pigment in pigment dispersion). The pigment content (% by mass) of the pigment dispersion is 1.0% by mass. The $D_{50}$ is a 50% cumulative particle size on a volume basis, and details thereof will be described below. The $D_{50}$ of the pigment after mixing with the reaction liquid is measured after the reaction has sufficiently proceeded. For example, after the reaction liquid and the pigment dispersion are mixed and sufficiently stirred, the measurement is performed. Any stirring method, such as a method using a stirring bar, may be used as long as the reaction can proceed sufficiently. In examples described below, a reaction liquid and a pigment dispersion were placed in a beaker and stirred with a stirrer for 30 seconds, and then the 50% cumulative particle size of the pigment was measured on a volume basis.

For example, in the case of a self-dispersible pigment, the rate of increase in the particle size of the pigment dispersed by the action of the carboxylic acid group can be adjusted by, for example, the density of the carboxylic acid group bonded to the particle surface of the pigment directly or via another atomic group. In the case of a resin-dispersed pigment, the acid value can be adjusted by the acid value of the resin dispersant used. The rate of increase in particle size can be increased by, for example, a method in which the density of the carboxylic acid group in the self-dispersible pigment is increased or a method in which the acid value of the resin dispersant in the resin-dispersed pigment is increased. When a fixed method is used for dispersing the pigment, the rate of increase in particle size also varies in accordance with the kind of the reactant used in combination in the reaction liquid. The pigment content (% by mass) of the ink is preferably 0.1% by mass or more to 15.0% by mass or less, more preferably 1.0% by mass or more to 10.0% by mass or less, based on the total mass of the ink.

Specific examples of the pigment include inorganic pigments, such as carbon black and titanium oxide; and organic pigments, such as azo, phthalocyanine, quinacridone, isoindolinone, imidazolone, diketopyrrolopyrrole and dioxazine pigments. These pigments may be used alone or in combination of two or more.

With regard to the mode of dispersion of the pigment, for example, a resin-dispersed pigment using a resin as a dispersant or a self-dispersible pigment in which a hydrophilic group is bonded to the particle surface of a pigment can be used. In addition, for example, a resin-bonded pigment obtained by chemically bonding an organic group containing a resin to the particle surface of a pigment or a microcapsule pigment obtained by covering the particle surface of a pigment with a resin or the like may be used. It is also possible to use a combination of pigments having different dispersion systems. Among these, instead of the resin-bonded pigment or microcapsule pigment, the resin-dispersed pigment in which a resin as a dispersant is physically adsorbed on the surface of a pigment particle can be used. That is, the pigment can be a pigment dispersed by the action of a resin (resin dispersant) having a carboxylic acid group. When the pigment is a self-dispersible pigment, the reactivity with the reactant may be easily increased to fail to obtain sufficient image clarity of an image. As the resin dispersant, a resin described below, particularly, a water-soluble resin can be used. The mass ratio of the pigment content (% by mass) to the resin dispersant content of the ink can be 0.3 times or more to 10.0 times or less.

As the self-dispersible pigment, a pigment in which at least a carboxylic acid group is bonded to the particle surface of the pigment directly or via another atomic group (—R—) can be used. An anionic group (a sulfonic acid group, a sulfate group, or a phosphonic acid group) other than the carboxylic acid group may be further bonded to the particle surface of the pigment. The anionic group, such as a carboxylic acid group, may be any of an acid form and a salt form. In the case of the salt form, the anionic group may be in any of a partially dissociated state and a completely dissociated state. When the anionic group is in a salt form, examples of the cation serving as a counter ion include an alkali metal cation; ammonium; and organic ammonium. Specific examples of the other atomic group (—R—) include a linear or branched alkylene group having 1 to 12 carbon atoms: an arylene group, such as a phenylene group or a naphthylene group; a carbonyl group; an imino group; an amide group; a sulfonyl group; an ester group; and an ether group. A combination of these groups may also be used.

The 50% cumulative particle size ($D_{50}$) of the pigment on a volume basis is preferably 10 nm or more to 300 nm or less, more preferably 20 nm or more to 200 nm or less. The 50% cumulative particle size of the pigment on a volume basis is a diameter of a particle at which a cumulative value from the small particle size side reaches 50% based on the total volume of the measured particle in a particle size cumulative curve. The 50% cumulative particle size of the pigment on a volume basis can be measured with a particle size analyzer using a dynamic light scattering method under measurement conditions described in the section of resin below. The rate of increase in the particle size of the pigment can also be measured by this method. However, the measured value may vary due to the influence of, for example, aggregation of the pigment. Thus, adjustment, such as a reduction in measurement time, can be performed as appropriate.

As described above, a carboxylic acid group is used as a functional group for dispersing a pigment. When a resin having a carboxylic acid group is used as a dispersant for a pigment (resin dispersant), a (meth)acrylic resin having a unit having a carboxylic acid group and a hydrophobic unit can be used.

The unit having a carboxylic acid group is a hydrophilic unit, and those described in the specific examples in the resin section described below can be used. As the hydrophobic unit, those described in the specific examples of the resin section below can be used.

The acid value of the resin having a carboxylic acid group (resin dispersant) can be 100 mgKOH/g or more. An acid value of the resin of less than 100 mgKOH/g results in a reduction in reactivity with the reactant, causing the pigment to be less likely to aggregate. This may fail to sufficiently inhibit image blurring. The acid value of the resin having a carboxylic acid group (resin dispersant) can be 200 mgKOH/g or less.

Resin Particle

The ink contains a resin particle. The resin particle content (% by mass) of the ink is preferably 0.1% by mass or more to 15.0% by mass or less, more preferably 1.0% by mass or more to 10.0% by mass or less, based on the total mass of the ink. The resin particle is present in the ink in a dispersed state, that is, in the form of a resin emulsion.

The term "resin particles" used in this specification refers to a resin that does not dissolve in the aqueous medium constituting the ink, and specifically, indicates a resin that can be present in the aqueous medium in the form of a particle with a particle size that can be measured by a dynamic light scattering method. The term "water-soluble resin" refers to a resin that can be dissolved in an aqueous medium constituting the ink, and specifically, indicates a resin that can be present in an aqueous medium in a state in which the resin does not form a particle having a particle size that can be measured by the dynamic light scattering method. The "resin particle" can also be referred to as a "water-dispersible resin (water-insoluble resin)". A method for determining whether the resin is a water-soluble resin or a resin particle by the dynamic light scattering method will be described below.

As described above, the resin particle is required to contain a particle that is not easily aggregated with the reactant of the reaction liquid. Specifically, the resin particle contains the first resin particle having a rate of increase in particle size of 3.0 times or less when the first resin particle comes into contact with the reaction liquid. The rate of increase in the particle size of the first resin particle can be 1.2 times or less. A rate of increase in particle size of 1.2 times or less indicates that the resin particle is hardly aggregated with the reactant. Therefore, the image clarity of an image can be further improved. The rate of increase in particle size can be 1.0 time or more. The rate of increase in the particle size of the resin particle is the rate of increase in particle size when the aqueous dispersion of the resin particle and the reaction liquid are mixed in a mass ratio of 1:1. Specifically, the rate is a value calculated by ($D_{50}$ of resin particle after mixing with reaction liquid)/($D_{50}$ of resin particle in aqueous dispersion of resin particle). Here, the resin particle content (% by mass) of the aqueous dispersion of the resin particle is 1.0% by mass based on the total mass of the aqueous dispersion. $D_{50}$ is a 50% cumulative particle size on a volume basis, and details thereof will be described below. The $D_{50}$ of the resin particle after mixing with the reaction liquid is measured after the reaction has sufficiently proceeded. For example, the measurement may be performed after the reaction liquid and the aqueous dispersion of the resin particle are mixed and sufficiently stirred. Any stirring method, such as a method using a stirring bar, may be used as long as the reaction can proceed sufficiently. In examples described below, a reaction liquid and an aqueous dispersion of a resin particle were placed in a beaker and stirred with a stirrer for 30 seconds, and then the 50% cumulative particle size of the resin particle was measured on a volume basis.

The rate of increase in the particle size of the resin particle can be adjusted by, for example, the density of the anionic group on the surface of the resin particle, the acid value of the resin particle, or the like. The rate of increase in particle size can be reduced by, for example, a method in which the density of the carboxylic acid group of the resin particle is reduced or a method in which the acid value of the resin particle is reduced. When the type of resin particle is fixed, the rate of increase in particle size varies in accordance with the kind of the reactant in the reaction liquid used in combination. Hereinafter, the "first resin particle" is also referred to as "resin particle".

The mass ratio of the amount (% by mass) of first resin particle contained to the total of the amount (% by mass) of second resin particle having a rate of increase in particle size of more than 3.0 times and the amount (% by mass) of pigment contained in the aqueous ink is 1.2 times or more to 25.0 times or less. The mass ratio of the amount (% by mass) of first resin particle contained to the total of the amount (% by mass) of second resin particle and the amount (% by mass) of pigment contained in the aqueous ink can be 1.5 times or more to 6.0 times or less. At a mass ratio of less than 1.5 times, the smoothing action of the resin particle on an image cannot be sufficiently provided. Thus, sufficient image clarity of the image is not obtained, in some cases. At a mass ratio of more than 6.0 times, the proportion of the component that is not easily aggregated in the ink is excessively increased, and the aggregated pigment is also easily moved together with the movement of the resin particle on the surface of the recording medium. This may fail to sufficiently inhibit image blurring.

As the dispersion type of resin particle, for example, an emulsification type using an emulsifier or a self-dispersible type that can be dispersed without using an emulsifier can be used. In the case of the emulsification-type resin particle, a resin that forms the resin particle may have a hydrophilic group, but does not necessarily have to have a hydrophilic group. The resin particle may be dispersed by the action of an emulsifier having a hydrophilic group. In the case of the self-dispersible type resin particle, a resin that forms the resin particle has a hydrophilic group. Examples of the hydrophilic group include at least one selected from the group consisting of a hydroxy group, an ethylene oxide group, a propylene oxide group, a sulfonic acid group, a sulfate group, a phosphonic acid group and a carboxylic acid group.

The hydrophilic group of the resin particle may be a nonionic hydrophilic group such as a hydroxy group, an ethylene oxide group or a propylene oxide group, or an anionic hydrophilic group such as a sulfonic acid group, a sulfate group, a phosphonic acid group or a carboxylic acid group. The rate of increase in the particle size of the resin particle can be adjusted in accordance with the type of reactant used in combination. When the reactant is an organic acid, the first resin particle can be a resin particle dispersed by the action of at least one hydrophilic group selected from the group consisting of a hydroxy group, an ethylene oxide group, a propylene oxide group, a sulfonic acid group, a sulfate group, a phosphonic acid group, and a carboxylic acid group. Here, when the resin particle has a carboxylic acid group in addition to the sulfonic acid group, most of the sulfonic acid groups are in an ionized state. For this reason, the resin particle can be considered to be a resin particle dispersed by the action of the sulfonic acid group.

When the first resin particle is a resin particle dispersed by the action of a carboxylic acid group, the acid value of the resin particle is preferably 11 mgKOH/g or less. In particular, the acid value of the resin particle (first resin particle) dispersed by the action of the carboxylic acid group is more preferably 5 mgKOH/g or less. When the acid value of the resin particle dispersed by the action of the carboxylic acid group is within the above range, the reactivity with the reactant can be reduced to further improve the image clarity of an image. The acid value of the resin particle (first resin particle) dispersed by the action of the carboxylic acid group can be 1 mgKOH/g or more. The acid value of the resin particle can be measured by, for example, potentiometric titration.

When the reactant is a polyvalent metal salt, the first resin particle can be a resin particle dispersed by the action of at least one hydrophilic group selected from the group consisting of a hydroxy group, an ethylene oxide group, a propylene oxide group, a sulfonic acid group, a sulfate group and a phosphonic acid group. When the reactant is a cationic resin, the first resin particle can be a resin particle dispersed by the action of at least one hydrophilic group selected from the group consisting of a hydroxy group, an ethylene oxide group and a propylene oxide group. The use of the resin particle dispersed by the action of a specific hydrophilic group in accordance with the type of reactant enables a reduction in reactivity with the reactant, thereby improving image clarity of an image.

The resin particle in the aqueous ink can have at least one anionic group selected from the group consisting of a sulfonic acid group, a sulfate group and a phosphonic acid group. When the hydrophilic group of the resin particle in the aqueous ink is only a nonionic hydrophilic group, such as a hydroxy group, an ethylene oxide group or a propylene oxide group, the resin particle does not have a surface charge. Thus, the resin particle does not have sufficient reactivity with the reactant or sufficient bleeding resistance, in some cases. Even if the resin particle has an anionic group, when the resin particle only has a carboxylic acid group, the resin particle may aggregate easily to fail to obtain sufficient image clarity of an image. The first resin particle in the aqueous ink can have at least one anionic group selected from the group consisting of a sulfonic acid group, a sulfate group and a phosphonic acid group.

The rate of increase in the particle size of the resin particle can be adjusted by changing the type or proportion of the hydrophilic group of the resin particle on the premise that the resin particle is dispersed by the hydrophilic group corresponding to the type of the reactant as described above. For example, when the reactant is a polyvalent metal salt, the rate of increase in particle size can be changed by using a carboxylic acid group in combination with at least one hydrophilic group selected from the group consisting of a hydroxy group, an ethylene oxide group, a propylene oxide group, a sulfonic acid group, a sulfate group and a phosphonic acid group. The nonionic hydrophilic group tends to easily decrease the reactivity. The anionic hydrophilic group tends to easily increase the reactivity. The rate of increase in the particle size of the resin particle dispersed by the action of the carboxylic acid group can be adjusted by, for example, the acid value of the resin particle. Specifically, a reduction in the acid value of the resin particle enables a reduction in the rate of increase in particle size. As in the case of the pigment, when a fixed method is used for dispersing the resin particle, the rate of increase in particle size varies in accordance with the kind of the reactant used in combination in the reaction liquid.

The constituent unit of the resin that forms the resin particle may be appropriately selected from the same units as those constituting the resin described below. The acid value of the resin constituting the resin particle can be 5 mgKOH/g or more to 100 mgKOH/g or less. The weight-average molecular weight of the resin constituting the resin particle is preferably 1,000 or more to 3,000,000 or less, more preferably 100,000 or more to 3,000,000 or less. The 50% cumulative particle size ($D_{50}$) of the resin particle measured by a dynamic light scattering method on a volume basis is preferably 50 nm or more to 500 nm or less, more preferably 100 nm or more to 300 nm or less. The 50% cumulative particle size of the resin particle on a volume basis is a diameter of a particle at which the cumulative value from the small particle size side reaches 50% based on the total volume of the measured particle in a particle size cumulative curve. The 50% cumulative particle size of the resin particle on a volume basis can be measured with a particle size analyzer using a dynamic light scattering method under measurement conditions described in the section of resin below. Whether a certain resin is a resin particle can be determined by whether the 50% cumulative particle size on a volume basis is measured in the above measurement. The glass transition temperature of the resin particle is preferably 40° C. or higher to 120° C. or lower, more preferably 50° C. or higher to 100° C. or lower. The glass transition temperature (C) of the resin particle can be measured with a differential scanning calorimeter (DSC). The resin particle does not need to contain a coloring material.

Composition Analysis of Resin Particle

The resin constituting the resin particle can be determined, for example, by the following method. The resin particle is dissolved in an organic solvent capable of dissolving the resin particle, such as tetrahydrofuran, to prepare a sample. The resin particle used at this time may be in the form of an aqueous dispersion or a dry state. The resulting sample is analyzed by, for example, nuclear magnetic resonance (NMR) spectroscopy or matrix-assisted laser desorption/ionization mass spectrometry (MALDI-MS). This makes it possible to know the types and proportions of units (monomers) constituting the resin. Alternatively, the resin particle itself may be analyzed by pyrolysis gas chromatography to detect units (monomers) constituting the resin. When an insoluble portion, which is not dissolved in the organic solvent, is generated at the time of preparing the sample, it is also possible to detect units (monomers) constituting the resin by analyzing the insoluble portion by pyrolysis gas chromatography.

Surfactant

The ink can contain a surfactant. The incorporation of a surfactant into the ink can reduce the surface tension of the ink to facilitate wetting and spreading of the ink on the surface of a recording medium, thereby improving image clarity of an image. The surfactant content (% by mass) of the ink is preferably 0.1% by mass or more to 5.0% by mass or less, more preferably 0.1% by mass or more to 2.0% by mass or less. Examples of the surfactant include an anionic surfactant, a cationic surfactant and a nonionic surfactant. A nonionic surfactant can be used because the nonionic surfactant is unlikely to affect the reactivity of the pigment and the resin particle with the reactant. In particular, the aqueous ink can further contain at least one surfactant selected from the group consisting of a fluorine-based nonionic surfactant and a silicone-based nonionic surfactant. The surfactant can effectively lower the surface tension of the ink without making the dispersion states of the pigment and the resin particle unstable, thus further improving the image clarity of an image.

The aqueous ink can contain a hydrocarbon-based nonionic surfactant in addition to the above surfactant. The use of the hydrocarbon-based surfactant in combination with the above-described surfactant can further improve the wettability of the ink, thus further improving the image clarity of an image.

The silicone-based nonionic surfactant is a surfactant obtained by introducing a hydrophilic group such as an ethylene oxide group into polyorganosiloxane having, as a main skeleton, a siloxane bond (SiO) in which silicon (Si) atoms and oxygen atoms (O) are alternately connected. Examples of the silicone-based surfactant include a polyether-modified siloxane compound, an alkyl polyether-modified siloxane compound, an alkyl silicone dendron polyether-modified siloxane compound and an alkyl silicone dendron diglycerin-modified siloxane compound. Depending on the site of introduction of the hydrophilic group, they can be roughly classified into a side-chain type and a straight-chain type. In this specification, the side-chain type indicates a polyorganosiloxane in which a hydrophilic group is introduced to a silicon atom other than a terminal of the polyorganosiloxane. The straight-chain type indicates a polyorganosiloxane in which a hydrophilic group is introduced into a silicon atom at one or each terminal of the polyorganosiloxane. Examples of the hydrophilic group include an alkylene oxide group and a hydroxy group. Examples of the alkylene oxide group include an ethylene oxide group, a propylene oxide group and a butylene oxide group. Among these, an ethylene oxide group and a propylene oxide group can be used. An example of the side-chain type structure is illustrated in the following formula (1), and an example of the straight-chain type structure is illustrated in the following formula (2):

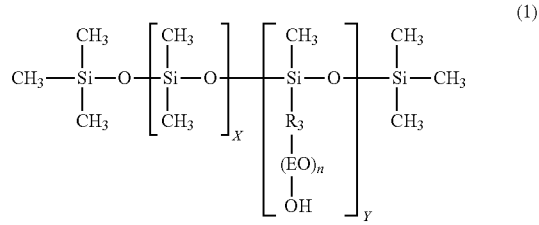

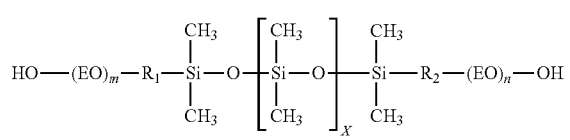

where in each of formulae (1) and (2), m, n, X and Y are each a natural number, $R_1$, $R_2$ and $R_3$ are each independently an alkylene group, and EO is an ethylene oxide group.

The fluorine-based nonionic surfactant is a surfactant having, as a main skeleton, a perfluoroalkyl group into which a hydrophilic group such as an ethylene oxide group is introduced. Examples of the fluorine-based surfactant include a perfluoroalkyl ethylene oxide adduct.

The hydrocarbon-based nonionic surfactant is a surfactant having a hydrocarbon as a main skeleton into which a hydrophilic group such as an ethylene oxide group is introduced. Examples of the hydrocarbon-based surfactant include polyoxyethylene alkyl ethers, ethylene oxide adducts of acetylene glycol, polyethylene glycol-polypropylene glycol block copolymers and ethylene oxide adducts of polyhydric alcohols. Hydrocarbon-based nonionic surfactants can be roughly classified into a side-chain type and a straight-chain type, on the basis of the site of introduction of the hydrophilic group. In this specification, the side-chain type indicates that a hydrophilic group is introduced to a carbon atom other than a terminal of the hydrocarbon chain. The straight-chain type indicates that a hydrophilic group is introduced to one terminal or each terminal of the hydrocarbon chain. An example of the side-chain type structure is illustrated in the following formula (3), and an example of the straight-chain type structure is illustrated in the following formula (4):

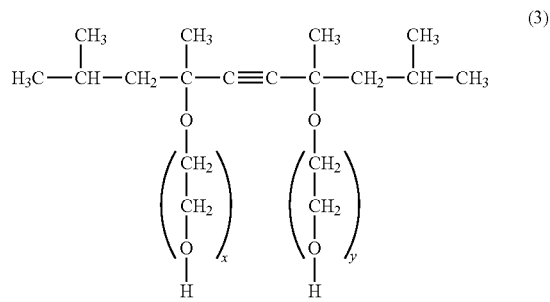

where in each of formulae (3) and (4), m, n, X and Y are each a natural number, and EO is an ethylene oxide group.

The silicone-based nonionic surfactant can be a compound having a structure in which a silicon atom at a position other than a terminal of a polyorganosiloxane chain having a siloxane repeating structure as a main skeleton is substituted with at least one hydrophilic group selected from the group consisting of an alkylene oxide group and a hydroxy group. The hydrocarbon-based nonionic surfactant can be a compound having a structure in which a carbon atom at a position other than a terminal of a hydrocarbon chain as a main skeleton is substituted with at least one hydrophilic group selected from the group consisting of an alkylene oxide group and a hydroxy group. That is, each of the silicone-based nonionic surfactant and the hydrocarbon-based nonionic surfactant in the aqueous ink can be of a side-chain type. When the surfactant is a straight-chain type surfactant, the surfactant is easily adsorbed on the pigment as compared to a side-chain type surfactant. Thus, the reaction between the pigment and the reactant is easily inhibited. This may fail to sufficiently inhibit image blurring.

Water-Soluble Resin

The ink can further contain a water-soluble resin. The water-soluble resin content (% by mass) of the ink is preferably 0.1% by mass or more to 15.0% by mass or less based on the total mass of the ink. In particular, water-soluble resin content (% by mass) of the ink is more preferably 0.5% by mass or more to 10.0% by mass or less based on the total mass of the ink.

The resin can be added to the ink in order to (i) stabilize the dispersion state of the pigment, that is, as a resin dispersant or an auxiliary thereof. In addition, the resin can be added to the ink in order to (ii) improve various characteristics of an image to be recorded. Examples of the form of the resin include a block copolymer, a random copolymer, a graft copolymer and a combination thereof.

Composition of Water-Soluble Resin

Examples of the water-soluble resin include an acrylic resin, a urethane-based resin and an olefin-based resin. Among these, an acrylic resin or a urethane-based resin can be used. An acrylic resin composed of a unit derived from (meth)acrylic acid or (meth)acrylate can be used. The water-soluble resin can be at least one selected from the group consisting of (i) a water-soluble resin including a unit having at least one selected from the group consisting of an ethylene oxide group and a propylene oxide group, and (ii) a block copolymer including a block composed of an acid group-free unit. The use of the water-soluble resin can further improve the image clarity of an image. The water-soluble resin content (% by mass) of the ink can be 0.1% by mass or more based on the total mass of the ink.

The acrylic resin can have a hydrophilic unit and a hydrophobic unit as constituent units. A resin having a hydrophilic unit derived from (meth)acrylic acid and a hydrophobic unit derived from at least one selected from the group consisting of an aromatic ring-containing monomer and a (meth)acrylate-based monomer can be used. In particular, a resin having a hydrophilic unit derived from (meth)acrylic acid and a hydrophobic unit derived from at least one monomer selected from the group consisting of styrene and α-methylstyrene can be used. These resins easily interact with a pigment and thus can be used as a resin dispersant for dispersing a pigment.

The hydrophilic unit is a unit having a hydrophilic group such as an anionic group. The hydrophilic unit can be formed, for example, by polymerizing a hydrophilic monomer having a hydrophilic group. Specific examples of the hydrophilic monomer having a hydrophilic group include acidic monomers each having a carboxylic acid group, such as (meth)acrylic acid, itaconic acid, maleic acid and fumaric acid; and anionic monomers, such as anhydrides and salts of those acidic monomers. Examples of a cation constituting the salt of the acidic monomer include a lithium ion, a sodium ion, a potassium ion, an ammonium ion and an organic ammonium ion. The hydrophobic unit is a unit free of a hydrophilic group, such as an anionic group. The hydrophobic unit can be formed, for example, by polymerizing a hydrophobic monomer having no hydrophilic group such as an anionic group. Specific examples of the hydrophobic monomer include monomers each having an aromatic ring, such as styrene, α-methylstyrene and benzyl (meth)acrylate; and (meth)acrylate monomers, such as methyl (meth)acrylate, butyl (meth)acrylate and 2-ethylhexyl (meth)acrylate.

The urethane-based resin can be prepared, for example, by reacting a polyisocyanate with a polyol. The urethane-based resin may be prepared by further subjecting a chain extender to a reaction with the polyisocyanate and the polyol. Examples of the olefin-based resin include polyethylene and polypropylene.

Properties of Water-Soluble Resin

In the present specification, "a resin is water-soluble" indicates that when the resin is neutralized with an alkali equivalent to the acid value, the resin is present in an aqueous medium in a state in which the resin does not form a particle having a particle size that can be measured by a dynamic light scattering method. Whether the resin is water-soluble can be determined in accordance with the following method. First, a liquid (resin solid content: 10% by mass) containing a resin neutralized with an alkali, such as sodium hydroxide or potassium hydroxide, equivalent to its acid value is prepared. Subsequently, the prepared liquid is diluted 10 times (on a volume basis) with pure water to prepare a sample solution. Then, in the case where the particle size of the resin in the sample solution is measured by the dynamic light scattering method and where a particle having a particle size is not measured, the resin can be determined to be water-soluble. The measurement conditions at this time can be as follows: for example, SetZero: 30 seconds; the number of times of measurement: 3 times; and measurement time: 180 seconds. A particle size analyzer based on the dynamic light scattering method (e.g., trade name: "UPA-EX150", available from Nikkiso Co., Ltd.) or the like may be used as a particle size distribution measurement apparatus. Of course, the particle size distribution measurement apparatus, the measurement conditions and so forth are not limited to the foregoing.

The acid value of the water-soluble resin is preferably 10 mgKOH/g or more to 200 mgKOH/g or less, more preferably 50 mgKOH/g or more to 150 mgKOH/g or less. The weight-average molecular weight of the water-soluble resin can be 3,000 or more to 15,000 or less. The weight-average molecular weight of the water-soluble resin can be measured by gel permeation chromatography in terms of polystyrene.

Wax Particle

The ink can contain a particle composed of wax (wax particle). The use of the ink containing the wax particle can record an image having further improved abrasion resistance. The wax in this specification may be a composition in which a component other than the wax is blended, or may be the wax itself. The wax particle may be dispersed by a dispersant such as a surfactant or a water-soluble resin. The wax may be used alone or in combination of two or more. The wax particle content (% by mass) of the ink is preferably 0.1% by mass or more to 10.0% by mass or less, more preferably 1.0% by mass or more to 5.0% by mass or less, based on the total mass of the ink.

In a narrow sense, the wax is an ester of a fatty acid with a higher monohydric alcohol or dihydric alcohol insoluble in water, and includes an animal wax and a vegetable wax but includes no oil or fat. In a broad sense, the wax includes a high-melting-point fat, a mineral-based wax, a petroleum-based wax and a blend and a modified product of various waxes. In the recording method according to an embodiment of the present invention, any wax in a broad sense can be used without particular limitation. The wax in a broad sense can be classified into natural wax, synthetic wax, a blend thereof (blended wax) and a modified product thereof (modified wax).

Examples of the natural wax include animal-based wax, such as beeswax, spermaceti, or wool wax (lanolin); plant-based wax, such as Japan wax, carnauba wax, sugarcane wax, palm wax, candelilla wax, or rice wax; mineral-based wax, such as montan wax; and petroleum-based wax, such as paraffin wax, microcrystalline wax and petrolatum. Examples of the synthetic wax include hydrocarbon wax, such as Fischer-Tropsch wax and polyolefin wax, e.g., polyethylene wax and polypropylene wax. The blended wax is a mixture of the various waxes described above. The modified wax is prepared by subjecting the above-described various waxes to modification treatment, such as oxidation, hydrogenation, alcohol modification, acrylic modification or urethane modification. These waxes may be used alone or in combination of two or more. The wax can be at least one selected from the group consisting of microcrystalline wax, Fischer-Tropsch wax, polyolefin wax, paraffin wax, modified products thereof and blends thereof. Among these, a blend of a plurality of waxes can be used. A blend of petroleum-based wax and synthetic wax can be used.

The wax can be solid at room temperature (25° C.) The melting point (C) of the wax is preferably 40° C. or higher to 120° C. or lower, more preferably 50° C. or higher to 100° C. or lower. The melting temperature of the wax can be determined in accordance with a test method described in 5.3.1 (testing method for melting point) of JIS K 2235:1991 (Petroleum waxes). For microcrystalline wax, petrolatum and a mixture of a plurality of waxes, the melting point can be more accurately measured by a test method described in 5.3.2. The melting point of the wax is easily affected by properties, such as molecular weight (a higher molecular weight results in a higher melting point), molecular structure (a linear structure has a high melting point, and a branched structure has a lower melting point), crystallinity (a high crystallinity results in a higher melting point) and density (a higher density results in a higher melting point). Thus, wax having a desired melting point can be produced by controlling these properties. The melting point of the wax in the ink can be determined by, for example, subjecting the ink to ultracentrifugation treatment, washing and drying the separated wax, and then performing measurement in accordance with the above-described test method.

Aqueous Medium

The ink used in the recording method according to an embodiment of the present invention is an aqueous ink containing at least water as an aqueous medium. The ink can contain water or an aqueous medium that is a mixed solvent of water and a water-soluble organic solvent. Deionized water or ion-exchanged water can be used as the water. The water content (% by mass) of the aqueous ink can be 50.0% by mass or more to 95.0% by mass or less based on the total mass of the ink. The water-soluble organic solvent content (% by mass) of the aqueous ink can be 3.0% by mass or more to 50.0% by mass or less based on the total mass of the ink.

The water-soluble organic solvent contains the first water-soluble organic solvent having a vapor pressure of $1.0 \times 10^{-2}$ kPa or more. The proportion (% by mass) of the first water-soluble organic solvent in the water-soluble organic solvent of the aqueous ink is 50.0% by mass or more. The proportion (% by mass) of the first water-soluble organic solvent in the water-soluble organic solvent of the aqueous ink can be 90.0% by mass or more. A proportion of less than 90% by mass may result in an increase in the amount of liquid component remaining inside a recorded image to fail to provide sufficient moisture absorption resistance of an image. The proportion (% by mass) of the first water-soluble organic solvent in the water-soluble organic solvent of the aqueous ink may be 100.0% by mass. That is, all of the water-soluble organic solvent of the ink may be the first water-soluble organic solvent. Examples of the first water-soluble organic solvent include 1,2-butanediol ($2.0 \times 10^{-2}$ kPa), propylene glycol (1,2-propanediol) ($1.8 \times 10^{-2}$ kPa), ethylene glycol (1,2-ethanediol) ($1.2 \times 10^{-2}$ kPa), diethylene glycol monoethyl ether ($1.7 \times 10^{-2}$ kPa) and diethylene glycol monomethyl ether ($2.4 \times 10^{-2}$ kPa). Examples of the water-soluble organic solvent other than the first water-soluble organic solvent include alcohol, (poly)alkylene glycol, glycol ether, a nitrogen-containing solvent and a sulfur-containing solvent, which can be used in an ink for ink jet recording. These water-soluble organic solvents may be used alone or in combination of two or more.

Other Components

The ink may contain various other components as needed. Examples of the other components include various additives, such as a defoaming agent, a surfactant, a pH adjuster, a viscosity modifier, a rust inhibitor, a preservative, an antifungal agent, an antioxidant, and a reduction inhibitor. However, the ink can be free of a reactant contained in the reaction liquid.

Physical Properties of Ink

The ink is an aqueous ink for use in an ink jet system. Thus, from the viewpoint of reliability, the physical property values can be appropriately controlled. The surface tension of the ink at 25° C. is preferably 20 mN/m or more to 60 mN/m or less, more preferably 20 mN/m or more to 30 mN/m or less. The viscosity of the ink at 25° C. can be 1.0 mPa·s or more to 10.0 mPa·s or less. The pH of the ink at 25° C. is preferably 7.0 or more to 9.5 or less, more preferably 8.0 or more to 9.5 or less.

EXAMPLES

While the present invention will be described in more detail with reference to Examples and Comparative Examples, the present invention is not limited at all by the following Examples as long as the gist of the present invention is not exceeded. Regarding the amount of component, "part(s)" and "%" are based on mass unless otherwise specified.

Preparation of Reaction Liquid

Components (unit: %) given in Tables 1 and 2 were mixed. The resulting mixtures were sufficiently stirred and subjected to pressure filtration through cellulose acetate filters (available from Toyo Roshi Kaisha, Ltd.) having a pore size of 3.0 μm to prepare respective reaction liquids. In Table 1, "Catiomaster PDT-2", "Catiomaster PD-7" and "Catiomaster PD-30" are trade names of aqueous solutions of amine-epichlorohydrin condensation polymers available from Yokkaichi Chemical Co., Ltd. "Acetylenol E60" is a trade name of a side-chain-type hydrocarbon-based nonionic surfactant available from Kawaken Fine Chemicals Co., Ltd. "Proxel GXL(S)" is a trade name of a preservative available from Arch Chemicals Inc. The vapor pressure values are values at 25° C. and 1 atm. Details of cationic resins used in the preparation of reaction liquids listed in Table 1 are described below.

Catiomaster PDT-2 (trade name): available from Yokkaichi Chemical Co., Ltd., weight-average molecular weight: 1,000, degree of cationization: 7 meq/g, resin content: 60.0%

Catiomaster PD-7 (trade name), available from Yokkaichi Chemical Co., Ltd., weight-average molecular weight: 5,000, degree of cationization: 7 meq/g, resin content: 50.0%

Catiomaster PD-30 (trade name), available from Yokkaichi Chemical Co., Ltd., weight-average molecular weight: 9,000, degree of cationization: 7 meq/g, resin content: 50.0%

PAS-2401 (trade name), available from Nittobo Medical Co., Ltd., weight-average molecular weight: 2,000, degree of cationization: 2 meq/g, resin content: 25.0%

PAS-A-5 (trade name), available from Nittobo Medical Co., Ltd., weight-average molecular weight: 4,000, degree of cationization: 3 meq/g, resin content: 40.0%

PAA-HCL-01 (trade name), available from Nittobo Medical Co., Ltd., weight-average molecular weight: 1,600, degree of cationization: 9 meq/g, resin content: 33.0%

Polyquat 40 u 05 NV (trade name), available from Katpol-Chemie GmbH, average molecular weight: 4,000, degree of cationization: 6 meq/g, resin content: 40.0%

TABLE 1

Compositions of Reaction Liquids

| | Reaction liquid | | | | | | | | | | |
|---|---|---|---|---|---|---|---|---|---|---|---|
| | 1 | 2 | 3 | 4 | 5 | 6 | 7 | 8 | 9 | 10 | 11 |
| Magnesium sulfate heptahydrate | 8.2 | 8.2 | 8.2 | 8.2 | | | | | | | |
| Calcium lactate pentahydrate | | | | | | | | | | 4.9 | |
| Calcium acetate monohydrate | | | | | | | | | | | 3.3 |
| Succinic acid (pKa: 4.0) | | | | | 2.0 | | | | | | |
| Malic acid (pKa: 3.2) | | | | | | | | 2.0 | | | |
| Tartaric acid (pKa: 3.0) | | | | | | 2.0 | | | | | |
| 1,2-Propanetricarboxylic acid (pKa: 3.5) | | | | | | | | | 2.0 | | |
| Acetic acid (pKa: 4.7) | | | | | | | 2.0 | | | | |
| Catiomaster PDT-2 | | | | | | | | | | | |
| Catiomaster PD-7 | | | | | | | | | | | |
| Catiomaster PD-30 | | | | | | | | | | | |
| PAS-2401 | | | | | | | | | | | |
| PAS-A-5 | | | | | | | | | | | |
| PAA-HCl-01 | | | | | | | | | | | |
| Polyquat 40 u 05 NV | | | | | | | | | | | |
| Aqueous dispersion of resin particle 6 | | | | | | | | | | | |
| Acetylenol E60 | 0.5 | 0.5 | 0.5 | 0.5 | 0.5 | 0.5 | 0.5 | 0.5 | 0.5 | 0.5 | 0.5 |
| 1,2-Butanediol (vapor pressure: $2.0 \times 10^{-2}$ kPa) | 19.0 | 19.0 | | 20.0 | 19.0 | 19.0 | 19.0 | 19.0 | 19.0 | 19.0 | 19.0 |
| Ethylene glycol (vapor pressure: $1.2 \times 10^{-2}$ kPa) | | | 19.0 | | | | | | | | |
| 2-Pyrrolidone (vapor pressure: $3.9 \times 10^{-3}$ kPa) | 1.0 | | | | 1.0 | 1.0 | 1.0 | 1.0 | 1.0 | 1.0 | 1.0 |
| 1,2-Hexanediol (vapor pressure: $2.6 \times 10^{-3}$ kPa) | | 1.0 | 1.0 | | | | | | | | |
| Proxel GXL(S) | 0.2 | 0.2 | 0.2 | 0.2 | 0.2 | 0.2 | 0.2 | 0.2 | 0.2 | 0.2 | 0.2 |
| Ion-exchanged water | 71.1 | 71.1 | 71.1 | 71.1 | 77.3 | 77.3 | 77.3 | 77.3 | 77.3 | 74.4 | 76.0 |

TABLE 2

Compositions of Reaction Liquids

| | Reaction liquid | | | | | | | | | | |
|---|---|---|---|---|---|---|---|---|---|---|---|
| | 12 | 13 | 14 | 15 | 16 | 17 | 18 | 19 | 20 | 21 | 22 |
| Magnesium sulfate heptahydrate | | | | | | | | 8.2 | 8.2 | 8.2 | 8.2 |
| Calcium lactate pentahydrate | | | | | | | | | | | |
| Calcium acetate monohydrate | | | | | | | | | | | |
| Succinic acid (pKa: 4.0) | | | | | | | | | | | |
| Malic acid (pKa: 3.2) | | | | | | | | | | | |
| Tartaric acid (pKa: 3.0) | | | | | | | | | | | |
| 1,2-Propanetricarboxylic acid (pKa: 3.5) | | | | | | | | | | | |
| Acetic acid (pKa: 4.7) | | | | | | | | | | | |
| Catiomaster PDT-2 | 5.0 | | | | | | | | | | |
| Catiomaster PD-7 | | 6.0 | | | | | | | | | |
| Catiomaster PD-30 | | | 6.0 | | | | | | | | |
| PAS-2401 | | | | 12.0 | | | | | | | |
| PAS-A-5 | | | | | 7.5 | | | | | | |
| PAA-HCl-01 | | | | | | 9.0 | | | | | |
| Polyquat 40 u 05 NV | | | | | | | 6.0 | | | | |
| Aqueous dispersion of resin particle 6 | | | | | | | | | | 1.0 | 1.1 |

TABLE 2-continued

Compositions of Reaction Liquids

| | Reaction liquid | | | | | | | | | | |
|---|---|---|---|---|---|---|---|---|---|---|---|
| | 12 | 13 | 14 | 15 | 16 | 17 | 18 | 19 | 20 | 21 | 22 |
| Acetylenol E60 | 0.5 | 0.5 | 0.5 | 0.5 | 0.5 | 0.5 | 0.5 | 0.5 | 0.5 | 0.5 | 0.5 |
| 1,2-Butanediol (vapor pressure: $2.0 \times 10^{-2}$ kPa) | 19.0 | 19.0 | 19.0 | 19.0 | 19.0 | 19.0 | 19.0 | 18.0 | 17.0 | 19.0 | 19.0 |
| Ethylene glycol (vapor pressure: $1.2 \times 10^{-2}$ kPa) | | | | | | | | | | | |
| 2-Pyrrolidone (vapor pressure: $3.9 \times 10^{-3}$ kPa) | 1.0 | 1.0 | 1.0 | 1.0 | 1.0 | 1.0 | 1.0 | 2.0 | 3.0 | 1.0 | 1.0 |
| 1,2-Hexanediol (vapor pressure: $2.6 \times 10^{-3}$ kPa) | | | | | | | | | | | |
| Proxel GXL(S) | 0.2 | 0.2 | 0.2 | 0.2 | 0.2 | 0.2 | 0.2 | 0.2 | 0.2 | 0.2 | 0.2 |
| Ion-exchanged water | 74.3 | 73.3 | 73.3 | 67.3 | 71.8 | 70.3 | 73.3 | 71.1 | 71.1 | 70.1 | 70.0 |

Preparation of Pigment Dispersion

Pigment Dispersion 1

A styrene-ethyl acrylate-acrylic acid copolymer (resin 1) having an acid value of 160 mgKOH/g and a weight-average molecular weight of 8,000 was prepared. Then 20.0 parts of resin 1 was neutralized with potassium hydroxide in an amount equimolar to the acid value thereof. Thereafter, an appropriate amount of pure water was added thereto to prepare an aqueous solution of resin 1, the solution having a resin content (solid content) of 20.0%. A mixture was prepared by mixing 15.0 parts of a pigment (carbon black (specific surface area: 200 m$^2$/g)), 37.5 parts of the aqueous solution of resin 1, and 47.5 parts of pure water. The resulting mixture and 200 parts of zirconia beads having a diameter of 0.3 mm were placed into a batch-type vertical sand mill (available from Aimex Co., Ltd.) and dispersed for 5 hours while the sand mill was cooled with water. After removing a coarse particle by centrifugation, pressure filtration was performed with a cellulose acetate filter (available from Toyo Roshi Kaisha, Ltd.) having a pore size of 3.0 μm to prepare pigment dispersion 1 having a pigment content of 15.0% and a resin dispersant (resin 1) content of 7.5%.

Pigment Dispersion 2

Pigment dispersion 2 having a pigment content of 15.0% and a resin dispersant (resin 2) content of 7.5% was prepared by the same procedure as that for pigment dispersion 1, except that resin 1 was changed to a resin (resin 2) having an acid value of 60 mgKOH/g and a weight-average molecular weight of 7,000.

Pigment Dispersion 3

Pigment dispersion 3 having a pigment content of 15.0% and a resin dispersant (resin 3) content of 7.5% was prepared by the same procedure as that for pigment dispersion 1, except that resin 1 was changed to a resin (resin 3) having an acid value of 50 mgKOH/g and a weight-average molecular weight of 7,500.

Pigment Dispersion 4

Pigment dispersion 4 having a pigment content of 15.0% and a resin dispersant (resin 4) content of 7.5% was prepared by the same procedure as that for pigment dispersion 1, except that resin 1 was changed to a resin (resin 4) having an acid value of 100 mgKOH/g and a weight-average molecular weight of 7,000.

Pigment Dispersion 5

Pigment dispersion 5 having a pigment content of 15.0% and a resin dispersant (resin 5) content of 7.5% was prepared by the same procedure as that for pigment dispersion 1, except that resin 1 was changed to a resin (resin 5) having an acid value of 92 mgKOH/g and a weight-average molecular weight of 8,400.

Pigment Dispersion 6

First, 20.0 g of carbon black (specific surface area: 200 m$^2$/g), 13.3 mmol of p-aminobenzoic acid, 13.3 mmol of nitric acid and 200 mL of pure water were mixed. They were mixed with a laboratory rotary mixer (trade name "Silverson LSM-A", available from Silverson) at 6,000 rpm and room temperature to prepare a mixture. After 30 minutes, potassium nitrite (equimolar to the (total) amount of the treatment agent) dissolved in a small amount of water was slowly added to the mixture and mixed. This mixing brought the temperature of the mixture to 60° C., and the reaction was performed in this state for 1 hour. Thereafter, the pH of the mixture was adjusted to 10 using an aqueous potassium hydroxide solution. After 30 minutes, 20 mL of pure water was added, and the mixture was subjected to diafiltration using a spectrum membrane to prepare a self-dispersible pigment. Water was added to the prepared self-dispersible pigment to prepare pigment dispersion liquid 6 having a pigment content of 10.0%. The amount of surface charge of the pigment in pigment dispersion 6 was 3.0 μmol/m$^2$. The amount of surface charge of the pigment was measured by colloid titration with an Automatic Potentiometric Titrator (trade name: AT-510, available from Kyoto Electronics Manufacturing Co., Ltd.) equipped with a streaming potential titration unit (PCD-500). Specifically, the pigment dispersion was diluted to about 300 times, on a weight basis, with pure water. Then the pH of the pigment dispersion was adjusted to about 10 with potassium hydroxide, as needed. The pigment dispersion was subjected to potentiometric titration using 5 mmol/L, methyl glycol chitosan as a titrant.

Pigment Dispersion 7

Pigment dispersion 7 having a pigment content of 10.0% was prepared in the same manner as in the preparation of pigment dispersion 6, except that p-aminobenzoic acid was changed to p-aminobenzenesulfonic acid. The amount of surface charge of the pigment in pigment dispersion 7 was 3.0 µmol/m$^2$.

Pigment Dispersion 8

Pigment dispersion 8 having a pigment content of 10.0% was prepared in the same manner as in the preparation of pigment dispersion 6, except that the amount of p-aminobenzoic acid was changed to 8.7 mmol. The amount of surface charge of the pigment in pigment dispersion 8 was 2.0 µmol/m$^2$.

Pigment Dispersion 9

Pigment dispersion 9 having a pigment content of 15.0% and a resin dispersant (resin 1) content of 7.5% was prepared by the same procedure as that for pigment dispersion 1, except that the pigment was changed to C.I. Pigment Blue 15:3.

Analysis of Resin Particle

50% Cumulative Particle Size of Resin Particle on Volume Basis

The 50% cumulative particle size ($D_{50}$) of a resin particle on a volume basis was measured as follows. A liquid containing a resin particle (an aqueous dispersion of the resin particle) was diluted with ion-exchanged water to prepare a sample having a resin particle content of about 1.0%. The particle size of this sample was measured with a particle size distribution analyzer (trade name: "Nanotrac WAVE II-Q", available from MicrotracBEL Corp.) by a dynamic light scattering method. The measurement conditions were as follows: SetZero: 30 seconds, the number of measurements: 3, measurement time: 180 seconds, shape: true sphere, refractive index: 1.6 and density: 1.0.

Acid Value of Resin Particle

The acid value of a resin particle was measured as follows. The resin particle was collected from a liquid containing the resin particle and washed with 1.0 mol/L hydrochloric acid and then with ion-exchanged water. The resin particle was added to 60 mL of a liquid, which had been prepared by mixing water and tetrahydrofuran in a mass ratio of 1:6, to dissolve the resin at 25° C., thereby preparing a sample. This sample was subjected to neutralization titration to measure the acid value of the resin. For the neutralization titration, an Automatic Potentiometric Titrator (trade name "AT-510", available from Kyoto Electronics Manufacturing Co., Ltd.) equipped with a combined glass electrode (trade name "C-171", available from Kyoto Electronics Manufacturing Co., Ltd.) was used. A titration reagent used was a 0.5 mol/L solution of potassium hydroxide in ethanol.

Preparation of Resin Particle

Resin Particles 1 to 6

In a four-necked flask equipped with a stirrer, a reflux condenser and a nitrogen gas inlet, ion-exchanged water and 0.2 parts of potassium persulfate were mixed. The amount of ion-exchanged water used was adjusted in such a manner that the amount of mixture containing components described below was 100.0 parts in total. The components given in Table 3 were mixed to prepare an emulsion. In a nitrogen atmosphere, the prepared emulsion was added dropwise to the four-necked flask over 1 hour. A polymerization reaction was performed at 80° C. for 2 hours under stirring. After cooling to 25° C., ion-exchanged water and an aqueous solution containing potassium hydroxide in an amount equimolar to the acid value of the resin particle were added thereto. Thereby, aqueous dispersions of resin particles 1 to 6 were prepared, each of the aqueous dispersions having a resin particle content (solid content) of 25.0%. In Table 3, "Adeka Reasoap ER-20" is a trade name of a nonionic surfactant available from ADEKA Corporation (amount by mole of ethylene oxide group added: 20). "Aqualon KH-05" is a trade name of an anionic surfactant available from DKS Co., Ltd. "Blemmer PME-1000" is a trade name of polyethylene glycol monomethacrylate (amount by mole of ethylene oxide group added: 23) available from NOF Corporation. The hydrophilic group contributing to the dispersion of each resin particle is described in the column of "Type of hydrophilic group". The resin particles 1 to 5 have a sulfonic acid group and a carboxylic acid group and are considered to be resin particles dispersed by the action of the sulfonic acid group in consideration of the acid dissociation constant.

TABLE 3

| | Compositions of resin particles | | | | | |
|---|---|---|---|---|---|---|
| | Resin particle | | | | | |
| | 1 | 2 | 3 | 4 | 5 | 6 |
| Ethyl methacrylate | 15.7 | 15.7 | 15.7 | 15.7 | 15.7 | |
| Butyl methacrylate | | | | | | 16.1 |
| Methacrylic acid | 0.5 | 0.5 | 0.5 | 1.0 | 1.0 | |
| Adeka Reasoap ER-20 | | | | | | 1.0 |
| Aqualon KH-05 | 1.0 | 0.8 | 0.5 | 0.5 | 0.4 | |
| Blemmer PME1000 | | | | | | 1.6 |
| Acid value (mgKOH/g) | 8 | 8 | 9 | 10 | 9 | 0 |
| Type of hydrophilic group | sulfonic acid group | sulfonic acid group | sulfonic acid group | sulfonic acid group | sulfonic acid group | ethylene oxide group |

Resin Particles 7 to 10

A mixture of components (unit: parts) described in the item of "Esterification reaction" in Table 4 was placed in a reaction vessel disposed in an autoclave and heated at 220° C. for 4 hours to perform esterification reaction. The temperature was then increased to 240° C., and the autoclave pressure was reduced to 13 Pa over 90 minutes. The esterification (dehydration condensation) reaction was continued while the state with a reduced pressure of 13 Pa was maintained for 5 hours at 240° C. Nitrogen gas was then introduced into the autoclave to bring the pressure to normal pressure. The temperature in the reaction vessel was reduced to 220° C. A catalyst (tetra-n-butyl titanate) and a component (unit: parts) described in the item of "Transesterification" in Table 4 were added. The mixture was heated at 220° C. for 2 hours to perform transesterification. The amount (mol) of catalyst used was $3\times10^{-4}\times$the total amount (mol) of polyvalent carboxylic acids used. Thereafter, nitrogen gas was introduced into the autoclave to create a pressurized state, and the sheet-like resin was taken out. The resin was cooled to 25° C. and then pulverized with a crusher.

A beaker with a volume of 2.0 L was equipped with a stirrer (trade name: "Tornado Stirrer Standard SM-104" available from As One Corporation). The resin synthesized above and tetrahydrofuran were placed in the beaker. The mixture was stirred at 25° C. to dissolve the resin. A 5.0% aqueous solution of sodium hydroxide was added in an amount equivalent to a neutralization ratio (mol %) based on the acid value of the resin. The mixture was stirred for 30 minutes. Then 900 parts of ion-exchanged water was added dropwise to the beaker at a rate of 20 mL/min while the mixture was stirred at 150 rpm and 10° C. Thereafter, the mixture was heated to 60° C. Tetrahydrofuran was distilled off under reduced pressure. Furthermore, water was partially distilled off. This beaker was placed in a water bath. Stirring was continued at 85° C. under the conditions described in the item of "Heat treatment" in Table 4 to perform heat treatment. The contents of the beaker were filtered using a 150-mesh wire gauze (a filter obtained by weaving 150 stainless steel wires in each of the vertical and horizontal directions in a square of 1 inch). An appropriate amount of ion-exchanged water was added to adjust the resin particle content. Thereby, aqueous dispersions of resin particles 7 to 10 were prepared, each of the aqueous dispersions having a resin particle content of 25.0%. The properties of the synthesized resin particles are described on the right side of Table 4. In Table 4, the abbreviations of the components are as follows: EG: ethylene glycol, BPA: bisphenol A, tPA: terephthalic acid, iPA: isophthalic acid and BTA: trimellitic acid. The hydrophilic group contributing to the dispersion of each resin particle is described in the column of "Type of hydrophilic group".

TABLE 4

Synthesis conditions and properties of resin particles

| Resin particle | Esterification reaction | | | | | Transesterification | Tetrahydrofuran | Neutralization ratio (mol %) | Heat treatment | | Properties | | Type of hydrophilic group |
|---|---|---|---|---|---|---|---|---|---|---|---|---|---|
| | EG | BPA | IPA | IPA | BTA | BTA | | | Stirring speed (rpm) | Time (hour) | $D_{50}$ (nm) | Acid value (mgKOH/g) | |
| 7 | 90.0 | 20.0 | 45.0 | 45.0 | 7.0 | 3.0 | 390 | 80 | 300 | 2 | 80 | 3 | carboxylic acid group |
| 8 | 90.0 | 10.0 | 50.0 | 50.0 | 6.9 | 3.1 | 390 | 80 | 150 | 1 | 120 | 11 | carboxylic acid group |
| 9 | 90.0 | 10.0 | 45.0 | 45.0 | 7.6 | 2.4 | 315 | 80 | 120 | 2 | 150 | 5 | carboxylic acid group |
| 10 | 90.0 | 20.0 | 45.0 | 45.0 | 6.4 | 3.6 | 390 | 80 | 150 | 1 | 120 | 6 | carboxylic acid group |

Preparation of Water-Soluble Resin

Water-Soluble Resin 1

Water-soluble resin 1, which is a block copolymer, was prepared using the components given in Table 5. A monomer (unit: parts) of an A block was synthesized by living radical polymerization. Specifically, in a nitrogen atmosphere at a temperature of −50° C., 30 parts of n-butyllithium was added to 1,600 parts of tetrahydrofuran to which 4.7 parts of lithium had been added, and then 60.0 parts of benzyl methacrylate was added, followed by stirring for 40 minutes. Then 30.0 parts of diethylzinc was added, and the mixture was stirred for 1 minute to prepare a liquid containing a polymer corresponding to the A block composed of a hydrophobic monomer unit.

Separately, 30.0 parts of n-butyl acrylate and 10.0 parts of acrylic acid were polymerized in the usual manner to prepare a random copolymer corresponding to a B block. The random copolymer corresponding to the B block and 45.0 parts of diethylzinc were added to 110 parts of tetrahydrofuran to prepare a liquid containing a random copolymer corresponding to the B block composed of a hydrophilic monomer unit.

This liquid was added dropwise to the liquid containing the polymer corresponding to the A block. After the mixture was stirred for 60 minutes, 1.3 parts of acetic acid was added to stop the reaction. To this liquid, 30.0 parts of a 35.0% aqueous solution of acetic acid was added, followed by stirring for 10 minutes. Washing was performed three times with pure water, and the precipitated resin was dried to give water-soluble resin 1. The mixture was neutralized with potassium hydroxide in an amount equimolar to the acid value. An appropriate amount of ion-exchanged water was added to prepare a liquid containing water-soluble resin 1, the liquid having a resin content of 10.0%. Water-soluble resin 1 is a block copolymer having the A block composed of only a unit derived from a hydrophobic monomer and the B block that is a random copolymer.

Water-Soluble Resin 2

First, 60.0 parts of benzyl acrylate, 30.0 parts of n-butyl acrylate, 5.0 parts of acrylic acid and 5.0 parts of Blemmer PME-400 were polymerized in the usual manner to prepare water-soluble resin 2 that was a random copolymer. The mixture was neutralized with potassium hydroxide in an amount equimolar to the acid value. An appropriate amount of ion-exchanged water was added to prepare a liquid containing water-soluble resin 2, the liquid having a resin content of 10.0%. Blemmer PME-400 is a trade name of polyethylene glycol monomethacrylate (amount by mole of ethylene oxide group added: 9) available from NOF Corporation.

Water-Soluble Resin 3

A liquid containing water-soluble resin 3 was prepared in the same manner as in the preparation method of water-soluble resin 2, except that 60.0 parts of benzyl acrylate, 30.0 parts of n-butyl acrylate and 10.0 parts of Blemmer PME-400 were used instead of 60.0 parts of benzyl acrylate, 30.0 parts of n-butyl acrylate, 5.0 parts of acrylic acid and 5.0 parts of Blemmer PME-400. The water-soluble resins 2 and 3 are each a water-soluble resin containing a unit having an ethylene oxide group (nonionic unit) and having an anionic group.

Water-Soluble Resin 4

As a liquid containing water-soluble resin 4, the aqueous solution of resin 1 used in the preparation of a pigment dispersion was used.

Preparation of Silicone-Based Surfactant

Silicone-Based Surfactant 1

Silicone-based surfactant 1 was synthesized in the following manner using a glass vessel equipped with a thermometer and a stirrer. In the vessel, a polysiloxane compound represented by the following formula (A) and a polyoxyethylene compound represented by the following formula (B) as main components were subjected to an addition reaction in the presence of a platinum catalyst to synthesize silicone-based surfactant 1. The addition reaction was continued until a surfactant having a weight-average molecular weight described below was obtained. Silicone-based surfactant 1 prepared was a nonionic compound having a structure in which $X=2$, $Y=1$, $n=13$ and $R_3$=n-propylene group in formula (1) and which corresponded to a side-chain type. The weight-average molecular weight of this surfactant was about 1,000.

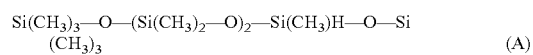

$$Si(CH_3)_3-O-(Si(CH_3)_2-O)_2-Si(CH_3)H-O-Si(CH_3)_3 \quad (A)$$

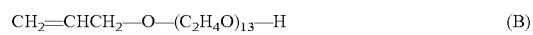

$$CH_2=CHCH_2-O-(C_2H_4O)_{13}-H \quad (B)$$

Silicone-Based Surfactant 2

Silicone-based surfactant 2 was prepared in the same manner as in the preparation of silicone-based surfactant 1, except that the polysiloxane compound and the polyoxyethylene compound were changed to the following formulae (C) and (D). The resulting surfactant was a nonionic compound having a structure in which $X=4$, $m=6$, $n=6$, $R_1$=n-propylene group and $R_2$=n-propylene group of formula (2) and which corresponded to a straight-chain type. The weight-average molecular weight of the surfactant was about 900.

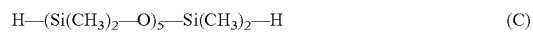

$$H-(Si(CH_3)_2-O)_5-Si(CH_3)_2-H \quad (C)$$

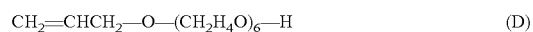

$$CH_2=CHCH_2-O-(CH_2H_4O)_6-H \quad (D)$$

Preparation of Ink

Components (unit: %) given in Tables 5 to 8 were mixed. The resulting mixtures were sufficiently stirred and subjected to pressure filtration through cellulose acetate filters (available from Toyo Roshi Kaisha, Ltd.) having a pore size of 3.0 µm to prepare respective inks. "Capstone FS3100" is a trade name of fluorine-based nonionic surfactant available from LEHVOSS Group. "NIKKOL BL4.2" is a trade name of a straight-chain-type hydrocarbon-based nonionic surfactant available from Nikko Chemicals Co., Ltd.

TABLE 5

Compositions and properties of inks

| | Ink | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion 1 | 20.0 | 20.0 | 20.0 | 20.0 | 20.0 | 20.0 | 20.0 | 20.0 | 20.0 | 20.0 | | 20.0 |
| Pigment dispersion 2 | | | | | | | | | | | | |
| Pigment dispersion 3 | | | | | | | | | | | | |
| Pigment dispersion 4 | | | | | | | | | | | | |
| Pigment dispersion 5 | | | | | | | | | | | | |
| Pigment dispersion 6 | | | | | | | | | | | | |
| Pigment dispersion 7 | | | | | | | | | | | | |
| Pigment dispersion 8 | | | | | | | | | | | | 30.0 | |
| Pigment dispersion 9 | | | | | | | | | | | | |
| Aqueous dispersion of resin particle 1 | 26.7 | 26.7 | 26.7 | 26.7 | 26.7 | 26.7 | | | | | 26.7 | |
| Aqueous dispersion of resin particle 2 | | | | | | | | | | | | |
| Aqueous dispersion of resin particle 3 | | | | | | | | | | | | |
| Aqueous dispersion of resin particle 4 | | | | | | | | | | | | |
| Aqueous dispersion of resin particle 5 | | | | | | | | | | | | |
| Aqueous dispersion of resin particle 6 | | | | | | | | | | | | 26.7 |
| Aqueous dispersion of resin particle 7 | | | | | | | | 32.0 | | | | |
| Aqueous dispersion of resin particle 8 | | | | | | | | | 32.0 | | | |
| Aqueous dispersion of resin particle 9 | | | | | | | | | | 32.0 | | |
| Aqueous dispersion of resin particle 10 | | | | | | | | | | | 32.0 | | |
| Aqueous dispersion of resin particle 11 | | | | | | | | | | | | |
| Liquid containing water-soluble resin 1 | 5.0 | 5.0 | 5.0 | 5.0 | | | 5.0 | 5.0 | 5.0 | 5.0 | 5.0 | 5.0 |

TABLE 5-continued

Compositions and properties of inks

| | Ink | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Liquid containing water-soluble resin 2 | | | | | 5.0 | | | | | | | |
| Liquid containing water-soluble resin 3 | | | | | | 5.0 | | | | | | |
| Liquid containing water-soluble resin 4 | | | | | | | | | | | | |
| Silicone-based surfactant 1 | 0.5 | 0.5 | 0.5 | 0.5 | 0.5 | 0.5 | 0.5 | 0.5 | 0.5 | 0.5 | 0.5 | 0.5 |
| Silicone-based surfactant 2 | | | | | | | | | | | | |
| Capstone FS3100 | | | | | | | | | | | | |
| Acetylenol E60 | 0.5 | 0.5 | 0.5 | 0.5 | 0.5 | 0.5 | 0.5 | 0.5 | 0.5 | 0.5 | 0.5 | 0.5 |
| NIKKOL BL4.2 | | | | | | | | | | | | |
| 1,2-Butanediol | 19.0 | 19.0 | | 20.0 | 19.0 | 19.0 | 19.0 | 19.0 | 19.0 | 19.0 | 19.0 | 19.0 |
| Ethylene glycol | | | 19.0 | | | | | | | | | |
| 2-Pyrrolidone | 1.0 | | | | 1.0 | 1.0 | 1.0 | 1.0 | 1.0 | 1.0 | 1.0 | 1.0 |
| 1,2-Hexanediol | | 1.0 | 1.0 | | | | | | | | | |
| Proxel GXL(S) | 0.2 | 0.2 | 0.2 | 0.2 | 0.2 | 0.2 | 0.2 | 0.2 | 0.2 | 0.2 | 0.2 | 0.2 |
| Ion-exchanged water | 27.1 | 27.1 | 27.1 | 27.1 | 27.1 | 27.1 | 21.8 | 21.8 | 21.8 | 21.8 | 17.1 | 32.1 |

TABLE 6

Compositions and properties of inks

| | Ink | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Pigment dispersion 1 | | | | | 20.0 | 20.0 | 20.0 | 20.0 | 20.0 | 20.0 | 20.0 | 13.3 |
| Pigment dispersion 2 | | | | 20.0 | | | | | | | | |
| Pigment dispersion 3 | | | | | | | | | | | | |
| Pigment dispersion 4 | | 20.0 | | | | | | | | | | |
| Pigment dispersion 5 | | | 20.0 | | | | | | | | | |
| Pigment dispersion 6 | 30.0 | | | | | | | | | | | |
| Pigment dispersion 7 | | | | | | | | | | | | |
| Pigment dispersion 8 | | | | | | | | | | | | |
| Pigment dispersion 9 | | | | | | | | | | | | |
| Aqueous dispersion of resin particle 1 | 26.7 | 26.7 | 26.7 | 26.7 | 26.7 | 26.7 | 26.7 | 26.7 | 26.7 | 26.7 | 12.0 | 9.3 |
| Aqueous dispersion of resin particle 2 | | | | | | | | | | | | |
| Aqueous dispersion of resin particle 3 | | | | | | | | | | | | |
| Aqueous dispersion of resin particle 4 | | | | | | | | | | | | |
| Aqueous dispersion of resin particle 5 | | | | | | | | | | | | |
| Aqueous dispersion of resin particle 6 | | | | | | | | | | | | |
| Aqueous dispersion of resin particle 7 | | | | | | | | | | | | |
| Aqueous dispersion of resin particle 8 | | | | | | | | | | | | |
| Aqueous dispersion of resin particle 9 | | | | | | | | | | | | |
| Aqueous dispersion of resin particle 10 | | | | | | | | | | | | |
| Aqueous dispersion of resin particle 11 | | | | | | | | | | | | |
| Liquid containing water-soluble resin 1 | | | | | | | | | | | | |
| Liquid containing water-soluble resin 2 | | | | | | | | | | | | |
| Liquid containing water-soluble resin 3 | | | | | | | | | | | | |
| Liquid containing water-soluble resin 4 | | | | | | | | | | | | |
| Silicone-based surfactant 1 | 0.5 | 0,5 | 0.5 | 0.5 | | 1.0 | | | | 0.5 | 0.5 | 0.5 |
| Silicone-based surfactant 2 | | | | | | | | | 0.5 | | | |
| Capstone FS3100 | | | | | | | 0.5 | 0.8 | | | | |
| Acetylenol E60 | 0.5 | 0.5 | 0.5 | 0.5 | 1.0 | | 0.5 | | 0.5 | | 0.5 | 0.5 |
| NIKKOL BL4.2 | | | | | | | | | | 0.5 | | |
| 1,2-Butanediol | 19.0 | 19.0 | 19.0 | 19.0 | 19.0 | 19.0 | 19.0 | 19.0 | 19.0 | 19.0 | 19.0 | 19.0 |
| Ethylene glycol | | | | | | | | | | | | |
| 2-Pyrrolidone | 1.0 | 1.0 | 1.0 | 1.0 | 1.0 | 1.0 | 1.0 | 1.0 | 1.0 | 1.0 | 1.0 | 1.0 |
| 1,2-Hexanediol | | | | | | | | | | | | |
| Proxel GXL(S) | 0.2 | 0.2 | 0.2 | 0.2 | 0.2 | 0.2 | 0.2 | 0.2 | 0.2 | 0.2 | 0.2 | 0.2 |
| Ion-exchanged water | 22.1 | 32.1 | 32.1 | 32.1 | 32.1 | 32.1 | 32.1 | 32.3 | 32.1 | 32.1 | 46.8 | 56.2 |

TABLE 7

Compositions and properties of inks

| | Ink | | | | | | | | | | | |
|---|---|---|---|---|---|---|---|---|---|---|---|---|
| | 25 | 26 | 27 | 28 | 29 | 30 | 31 | 32 | 33 | 34 | 35 | 36 |
| Pigment dispersion 1 | 13.3 | 20.0 | 13.3 | 13.3 | 2.0 | 20.0 | 20.0 | 20.0 | 20.0 | 20.0 | 20.0 | 20.0 |
| Pigment dispersion 2 | | | | | | | | | | | | |
| Pigment dispersion 3 | | | | | | | | | | | | |
| Pigment dispersion 4 | | | | | | | | | | | | |
| Pigment dispersion 5 | | | | | | | | | | | | |
| Pigment dispersion 6 | | | | | | | | | | | | |
| Pigment dispersion 7 | | | | | | | | | | | | |
| Pigment dispersion 8 | | | | | | | | | | | | |
| Pigment dispersion 9 | | | | | | | | | | | | |
| Aqueous dispersion of resin particle 1 | 10.0 | 20.0 | 40.0 | 41.0 | 25.0 | | | | 26.7 | 26.7 | 26.7 | 26.7 |
| Aqueous dispersion of resin particle 2 | | | | | | 26.7 | | | | | | |
| Aqueous dispersion of resin particle 3 | | | | | | | 26.7 | | | | | |
| Aqueous dispersion of resin particle 4 | | | | | | | | 26.7 | | | | |
| Aqueous dispersion of resin particle 5 | | | | | | | | | | | | |
| Aqueous dispersion of resin particle 6 | | | | | | | | | | | | |
| Aqueous dispersion of resin particle 7 | | 3.0 | | | | | | | | | | |
| Aqueous dispersion of resin particle 8 | | | | | | | | | | | | |
| Aqueous dispersion of resin particle 9 | | | | | | | | | | | | |
| Aqueous dispersion of resin particle 10 | | | | | | | | | | | | |
| Aqueous dispersion of resin particle 11 | | | | | | | | | | | | |
| Liquid containing water-soluble resin 1 | | | | | | | | | | | | 1.0 |
| Liquid containing water-soluble resin 2 | | | | | | | | | | | | |
| Liquid containing water-soluble resin 3 | | | | | | | | | | | | |
| Liquid containing water-soluble resin 4 | | | | | | | | | | | | |
| Silicone-based surfactant 1 | 0.5 | 0.5 | 0.5 | 0.5 | 0.5 | 0.5 | 0.5 | 0.5 | 0.5 | 0.5 | 0.5 | 0.5 |
| Silicone-based surfactant 2 | | | | | | | | | | | | |
| Capstone FS3100 | | | | | | | | | | | | |
| Acetylenol E60 | 0.5 | 0.5 | 0.5 | 0.5 | 0.5 | 0.5 | 0.5 | 0.5 | 0.5 | 0.5 | 0.5 | 0.5 |
| NIKKOL BL4.2 | | | | | | | | | | | | |
| 1,2-Butanediol | 19.0 | 19.0 | 19.0 | 19.0 | 19.0 | 19.0 | 19.0 | 19.0 | 18.0 | 17.0 | 10.0 | 19.0 |
| Ethylene glycol | | | | | | | | | | | | |
| 2-Pyrrolidone | 1.0 | 1.0 | 1.0 | 1.0 | 1.0 | 1.0 | 1.0 | 1.0 | 2.0 | 3.0 | 10.0 | 1.0 |
| 1,2-Hexanediol | | | | | | | | | | | | |
| Proxel GXL(S) | 0.2 | 0.2 | 0.2 | 0.2 | 0.2 | 0.2 | 0.2 | 0.2 | 0.2 | 0.2 | 0.2 | 0.2 |
| Ion-exchanged water | 55.5 | 35.8 | 25.5 | 24.5 | 51.8 | 32.1 | 32.1 | 32.1 | 32.1 | 32.1 | 32.1 | 31.1 |

TABLE 8

Compositions and properties of inks

| | Ink | | | | | | | | | | |
|---|---|---|---|---|---|---|---|---|---|---|---|
| | 37 | 38 | 39 | 40 | 41 | 42 | 43 | 44 | 45 | 46 | 47 |
| Pigment dispersion 1 | 20.0 | 20.0 | 20.0 | 20.0 | 20.0 | | 20.0 | 2.0 | 20.0 | 20.0 | |
| Pigment dispersion 2 | | | | | | | | | | | |
| Pigment dispersion 3 | | | | | | 20.0 | | | | | |
| Pigment dispersion 4 | | | | | | | | | | | |
| Pigment dispersion 5 | | | | | | | | | | | |
| Pigment dispersion 6 | | | | | | | | | | | |
| Pigment dispersion 7 | | | | 30.0 | | | | | | | |
| Pigment dispersion 8 | | | | | | | | | | | |
| Pigment dispersion 9 | | | | | | | | | | | |
| Aqueous dispersion of resin particle 1 | 26.7 | 26.7 | | 26.7 | | | 26.7 | 10.0 | 26.0 | 26.7 | |
| Aqueous dispersion of resin particle 2 | | | | | | | | | | | |
| Aqueous dispersion of resin particle 3 | | | | | | | | | | | |
| Aqueous dispersion of resin particle 4 | | | | | | | | | | | |
| Aqueous dispersion of resin particle 5 | | | 26.7 | | | | | | | | |
| Aqueous dispersion of resin particle 6 | | | | | | | | | | | |
| Aqueous dispersion of resin particle 7 | | | | | | | | | | | |
| Aqueous dispersion of resin particle 8 | | | | | | | | | | | |
| Aqueous dispersion of resin particle 9 | | | | | | | | | | | |
| Aqueous dispersion of resin particle 10 | | | | | | | | | | | |
| Aqueous dispersion of resin particle 11 | | | | | | | | | | | 32.0 |
| Liquid containing water-soluble resin 1 | 0.4 | | | | | | | | | | |
| Liquid containing water-soluble resin 2 | | | | | | | | | | | |
| Liquid containing water-soluble resin 3 | | | | | | | | | | | |
| Liquid containing water-soluble resin 4 | | 5.0 | | | 40.0 | | | | | | |

TABLE 8-continued

Compositions and properties of inks

| | Ink | | | | | | | | | | |
|---|---|---|---|---|---|---|---|---|---|---|---|
| | 37 | 38 | 39 | 40 | 41 | 42 | 43 | 44 | 45 | 46 | 47 |
| Silicone-based surfactant 1 | 0.5 | 0.5 | 0.5 | 0.5 | 0.5 | 0.5 | 0.5 | 0.5 | 0.5 | 0.5 | 0.5 |
| Silicone-based surfactant 2 | | | | | | | | | | | |
| Capstone FS3100 | | | | | | | | | | | |
| Acetylenol E60 | 0.5 | 0.5 | 0.5 | 0.5 | 0.5 | 0.5 | 0.5 | 0.5 | 0.5 | 0.5 | 0.5 |
| NIKKOL BL4.2 | | | | | | | | | | | |
| 1,2-Butanediol | 19.0 | 19.0 | 19.0 | 19.0 | 19.0 | 19.0 | 19.0 | 19.0 | 19.0 | 9.0 | 19.0 |
| Ethylene glycol | | | | | | | | | | | |
| 2-Pyrrolidone | 1.0 | 1.0 | 1.0 | 1.0 | 1.0 | 1.0 | 1.0 | 1.0 | 1.0 | 11.0 | 1.0 |
| 1,2-Hexanediol | | | | | | | | | | | |
| Proxel GXL(S) | 0.2 | 0.2 | 0.2 | 0,2 | 0.2 | 0.2 | 0.2 | 0.2 | 0.2 | 0.2 | 0.2 |
| Ion-exchanged water | 31.7 | 27.1 | 32.1 | 22.1 | 18.8 | 58.8 | 32.1 | 48.8 | 50.8 | 32.1 | 26.8 |

Provision of Recording Medium

The following recording media 1 to 3 were provided.

Recording medium 1: trade name "Scotchcal Graphic Film IJ1220-10" (available from 3M, material: poly(vinyl chloride), amount of water absorbed from start of contact to 30 msec$^{1/2}$ in Bristow method is 0 mL/m$^2$ or more to 10 mL/m$^2$ or less)

Recording medium 2: trade name "Canon Photo Paper, Gloss Professional [Platinum Grade] PT-201", (available from CANON KABUSHIKI KAISHA, amount of water absorbed from start of contact to 30 msec$^{1/2}$ in Bristow method is more than 10 mL/m?)

Recording medium 3: trade name "GIY-0305" (available from Lintec Corporation, material: PET, amount of water absorbed from start of contact to 30 msec$^{1/2}$ in Bristow method is 0 mL/m$^2$ or more to 10 mL/m$^2$ or less)

Evaluation

The prepared reaction liquids and inks were filled into respective cartridges. The cartridges were set in an ink jet recording apparatus (trade name "imagePROGRAF PRO-2000", available from CANON KABUSHIKI KAISHA) equipped with a recording bead configured to discharge an ink using thermal energy. In this recording apparatus, a beating device configured to dry a recording medium to which the reaction liquid and the ink were applied was incorporated at a position on the downstream side of the recording head in the conveyance direction of the recording medium. Then, the surface temperature of the recording medium was set to 80° C. by heating with the heating device. The recording environment was a temperature of 25° C. and a relative humidity of 50%. In the examples, an image recorded under the condition in which one ink droplet having a weight of 4.0 ng is applied to a unit region of 1/1,200 inch×1/1,200 inch is defined as a recording duty of 100%. Solid images were recorded on the recording media given in Tables 9 and 10 by applying the reaction liquids and the inks given in Tables 9 and 10 in an overlapping manner at a recording duty of the reaction liquid of 40% and a recording duty of the ink of 200%. Thereafter, solid images were recorded at positions adjacent to the above solid images under the same conditions as above, except that ink 4 was used. Drying was performed at 25° C. for 24 hours to obtain images for evaluation. In the examples of the present invention, "AA", "A" and "B" were regarded as acceptable levels, and "C" was regarded as an unacceptable level in the evaluation criteria of the following items. Table 11 presents the evaluation results.

When the ink contained a resin particle having a rate of increase in particle size of more than 3.0 times, the content thereof was described in the column of "Another resin particle R (%)" in Tables 9 and 10. Ink 26 in Example 39 contained two types of resin particles. Resin particle 7 corresponded to another resin particle (second resin particle). The rate of increase in particle size when used together with reaction liquid 1 was about 40.0 times.

Inhibition of Image Blurring

For the resulting images for evaluation, the raggedness value of the boundary portion between adjacent solid images was measured using a hand-held image quality analyzer (trade name "PIAS-II", available from Quality Engineering Associates Inc.). The raggedness value is a value defined in ISO 13660, and edge measurement was used as a measurement mode. The inhibition of blurring was evaluated according to the following evaluation criteria. A low raggedness value of the boundary portion indicates that color mixing of adjacent images is inhibited, that is, the blurring of the images is inhibited.

AA: The raggedness value was 50 or less.
A: The raggedness value was more than 50 to 60 or less.
B: The raggedness value was more than 60 to 70 or less.
C: The raggedness value was more than 70.

Image Clarity

The resulting solid images for evaluation were attached to test stands having curvature radii of 200 mm, 60 mm and 45 mm. Two fluorescent lamps arranged at an interval of 10 cm were used as observation light sources. The images were illuminated with fluorescent light from a distance of 2 m. The shape of the fluorescent lamps projected on regions recorded with the inks described in Tables 9 and 10 in the images for evaluation was visually observed under the conditions of an illumination angle of 45° and an observation angle of 45°. The image clarity of the images was evaluated according to the evaluation criteria described below.

AA: The boundary between the two projected fluorescent lamps was recognized on each of the images attached to the test stands.
A: The boundary between the two projected fluorescent lamps was not recognized on the image attached to the test stand having a curvature radius of 200 mm, whereas the boundary between the two projected fluorescent lamps was recognized on the images attached to the test stands having curvature radii of 60 mm and 45 mm.

B: The boundary between the two projected fluorescent lamps was not found on the images attached to the test stands having curvature radii of 200 mm and 60 mm, whereas the boundary between the two projected fluorescent lamps was recognized on the image attached to the test stand having a curvature radius of 45 mm.

C: The boundary between the two projected fluorescent lamps was not recognized in any of the images attached to the test stands.

Moisture Absorption Resistance

The lightness L* of each of the resulting images for evaluation was measured under the conditions of a D50 illuminant, a viewing angle of 2°, an incident angle of 45°, a reflection angle of 0° and a filter: ANSI A. Thereafter, the solid image was placed in an environment at a temperature of 30° C. and a humidity of 80% for 7 days, and then the lightness L* was measured in the same manner. Here, lightness L* is a value in the L*a*b* color specification system defined by Commission Internationale de l'Eclairage (CIE). The difference in L* before and after the placement was calculated, and the moisture absorption resistance of the image was evaluated according to the following evaluation criteria.

AA: The difference in lightness L* before and after placement was 1 or less.

A: The difference in lightness L* before and after placement was more than 1 and 2 or less.

B: The difference in lightness L* between before and after placement was more than 2 and 3 or less.

C: The difference in lightness L* before and after placement was more than 3.

TABLE 9

| | | | | | Evaluation conditions | | | | |
| | | | | | Rate of increase in particle size (time) | | Content, proportion | | |
| | | | | | | | First resin | Another resin | |
| | | Recording medium | Reaction liquid | Ink | Pigment | First resin particle | Pigment P (%) | particle $R_1$ (%) | particle R (%) | Value of $R_1/(P+R)$ (time) |
|---|---|---|---|---|---|---|---|---|---|---|
| Example | 1 | 1 | 1 | 1 | 1 | 32.0 | 1.0 | 3.00 | 8.01 | 0.00 | 2.67 |
| | 2 | 3 | 1 | 1 | 1 | 32.0 | 1.0 | 3.00 | 8.01 | 0.00 | 2.67 |
| | 3 | 1 | 2 | 2 | 1 | 32.0 | 1.0 | 3.00 | 8.01 | 0.00 | 2.67 |
| | 4 | 1 | 3 | 3 | 1 | 32.0 | 1.0 | 3.00 | 8.01 | 0.00 | 2.67 |
| | 5 | 1 | 4 | 4 | 1 | 32.0 | 1.0 | 3.00 | 8.01 | 0.00 | 2.67 |
| | 6 | 1 | 1 | 5 | 1 | 32.0 | 1.0 | 3.00 | 8.01 | 0.00 | 2.67 |
| | 7 | 1 | 1 | 6 | 1 | 32.0 | 1.0 | 3.00 | 8.01 | 0.00 | 2.67 |
| | 8 | 1 | 5 | 1 | 1 | 40.0 | 1.0 | 3.00 | 8.01 | 0.00 | 2.67 |
| | 9 | 1 | 6 | 1 | 1 | 42.0 | 1.0 | 3.00 | 8.01 | 0.00 | 2.67 |
| | 10 | 1 | 5 | 7 | 1 | 40.0 | 1.0 | 3.00 | 8.00 | 0.00 | 2.67 |
| | 11 | 1 | 7 | 7 | 1 | 39.0 | 2.8 | 3.00 | 8.00 | 0.00 | 2.67 |
| | 12 | 1 | 5 | 8 | 1 | 40.0 | 2.9 | 3.00 | 8.00 | 0.00 | 2.67 |
| | 13 | 1 | 8 | 7 | 1 | 39.0 | 1.1 | 3.00 | 8.00 | 0.00 | 2.67 |
| | 14 | 1 | 9 | 7 | 1 | 30.0 | 1.0 | 3.00 | 8.00 | 0.00 | 2.67 |
| | 15 | 1 | 5 | 9 | 1 | 40.0 | 2.1 | 3.00 | 8.00 | 0.00 | 2.67 |
| | 16 | 1 | 5 | 10 | 1 | 40.0 | 2.3 | 3.00 | 8.00 | 0.00 | 2.67 |
| | 17 | 1 | 10 | 1 | 1 | 32.0 | 1.0 | 3.00 | 8.01 | 0.00 | 2.67 |
| | 18 | 1 | 1 | 11 | 1 | 31.0 | 1.0 | 3.00 | 8.01 | 0.00 | 2.67 |
| | 19 | 1 | 11 | 12 | 1 | 32.0 | 1.0 | 3.00 | 8.01 | 0.00 | 2.67 |
| | 20 | 1 | 12 | 12 | 1 | 45.0 | 1.0 | 3.00 | 8.01 | 0.00 | 2.67 |
| | 21 | 1 | 13 | 12 | 1 | 45.0 | 1.0 | 3.00 | 8.01 | 0.00 | 2.67 |
| | 22 | 1 | 14 | 12 | 1 | 45.0 | 1.0 | 3.00 | 8.01 | 0.00 | 2.67 |
| | 23 | 1 | 15 | 12 | 1 | 45.0 | 1.0 | 3.00 | 8.01 | 0.00 | 2.67 |
| | 24 | 1 | 16 | 12 | 1 | 45.0 | 1.0 | 3.00 | 8.01 | 0.00 | 2.67 |
| | 25 | 1 | 17 | 12 | 1 | 45.0 | 1.0 | 3.00 | 8.01 | 0.00 | 2.67 |
| | 26 | 1 | 1 | 13 | 1 | 40.0 | 1.0 | 4.50 | 8.01 | 0.00 | 1.78 |
| | 27 | 1 | 1 | 14 | 1 | 29.0 | 1.0 | 3.00 | 8.01 | 0.00 | 2.67 |
| | 28 | 1 | 1 | 15 | 1 | 27.0 | 1.0 | 3.00 | 8.01 | 0.00 | 2.67 |
| | 29 | 1 | 1 | 16 | 1 | 8.0 | 1.0 | 3.00 | 8.01 | 0.00 | 2.67 |
| | 30 | 1 | 1 | 17 | 1 | 32.0 | 1.0 | 3.00 | 8.01 | 0.00 | 2.67 |
| | 31 | 1 | 1 | 18 | 1 | 32.0 | 1.0 | 3.00 | 8.01 | 0.00 | 2.67 |
| | 32 | 1 | 1 | 19 | 1 | 32.0 | 1.0 | 3.00 | 8.01 | 0.00 | 2.67 |
| | 33 | 1 | 1 | 20 | 1 | 32.0 | 1.0 | 3.00 | 8.01 | 0.00 | 2.67 |
| | 34 | 1 | 1 | 21 | 1 | 32.0 | 1.0 | 3.00 | 8.01 | 0.00 | 2.67 |
| | 35 | 1 | 1 | 22 | 1 | 32.0 | 1.0 | 3.00 | 8.01 | 0.00 | 2.67 |
| | 36 | 1 | 1 | 23 | 1 | 32.0 | 1.0 | 3.00 | 3.60 | 0.00 | 1.20 |

TABLE 10

| | | Recording medium | Reaction liquid | Ink | Pigment | Rate of increase in particle size (time) First resin particle | Pigment P (%) | First resin particle $R_1$ (%) | Another resin particle R (%) | Value of $R_1/(P+R)$ (time) |
|---|---|---|---|---|---|---|---|---|---|---|
| Example | 37 | 1 | 1 | 24 | 32.0 | 1.0 | 2.00 | 2.79 | 0.00 | 1.40 |
| | 38 | 1 | 1 | 25 | 32.0 | 1.0 | 2.00 | 3.00 | 0.00 | 1.50 |
| | 39 | 1 | 1 | 26 | 32.0 | 1.0 | 3.00 | 6.00 | 0.75 | 1.60 |
| | 40 | 1 | 1 | 27 | 32.0 | 1.0 | 2.00 | 12.00 | 0.00 | 6.00 |
| | 41 | 1 | 1 | 28 | 32.0 | 1.0 | 2.00 | 12.30 | 0.00 | 6.15 |
| | 42 | 1 | 1 | 29 | 32.0 | 1.0 | 0.30 | 7.50 | 0.00 | 25.00 |
| | 43 | 1 | 5 | 12 | 40.0 | 1.0 | 3.00 | 8.01 | 0.00 | 2.67 |
| | 44 | 1 | 1 | 12 | 32.0 | 1.0 | 3.00 | 8.01 | 0.00 | 2.67 |
| | 45 | 1 | 18 | 12 | 45.0 | 1.0 | 3.00 | 8.01 | 0.00 | 2.67 |
| | 46 | 1 | 1 | 30 | 32.0 | 1.2 | 3.00 | 8.01 | 0.00 | 2.67 |
| | 47 | 1 | 1 | 31 | 32.0 | 1.5 | 3.00 | 8.01 | 0.00 | 2.67 |
| | 48 | 1 | 1 | 32 | 32.0 | 3.0 | 3.00 | 8.01 | 0.00 | 2.67 |
| | 49 | 1 | 1 | 33 | 32.0 | 1.0 | 3.00 | 8.01 | 0.00 | 2.67 |
| | 50 | 1 | 1 | 34 | 32.0 | 1.0 | 3.00 | 8.01 | 0.00 | 2.67 |
| | 51 | 1 | 1 | 35 | 32.0 | 1.0 | 3.00 | 8.01 | 0.00 | 2.67 |
| | 52 | 1 | 19 | 1 | 32.0 | 1.0 | 3.00 | 8.01 | 0.00 | 2.67 |
| | 53 | 1 | 20 | 1 | 32.0 | 1.0 | 3.00 | 8.01 | 0.00 | 2.67 |
| | 54 | 1 | 21 | 1 | 32.0 | 1.0 | 3.00 | 8.01 | 0.00 | 2.67 |
| | 55 | 1 | 22 | 1 | 32.0 | 1.0 | 3.00 | 8.01 | 0.00 | 2.67 |
| | 56 | 1 | 1 | 36 | 32.0 | 1.0 | 3.00 | 8.01 | 0.00 | 2.67 |
| | 57 | 1 | 1 | 37 | 32.0 | 1.0 | 3.00 | 8.01 | 0.00 | 2.67 |
| | 58 | 1 | 1 | 38 | 32.0 | 1.0 | 3.00 | 8.01 | 0.00 | 2.67 |
| Comparative example | 1 | 2 | 1 | 1 | 32.0 | 1.0 | 3.00 | 8.01 | 0.00 | 2.67 |
| | 2 | 2 | 1 | 39 | 32.0 | 4.0 | 3.00 | 8.01 | 0.00 | 2.67 |
| | 3 | 1 | 1 | 40 | 1.5 | 1.0 | 0.00 | 8.01 | 0.00 | — |
| | 4 | 1 | 1 | 41 | 32.0 | — | 3.00 | 0.00 | 0.00 | 0.00 |
| | 5 | 1 | 1 | 42 | 32.0 | — | 3.00 | 0.00 | 0.00 | 0.00 |
| | 6 | 1 | no | 1 | 32.0 | 1.0 | 3.00 | 8.01 | 0.00 | 2.67 |
| | 7 | 1 | 1 | 43 | 7.0 | 1.0 | 3.00 | 8.01 | 0.00 | 2.67 |
| | 8 | 1 | 1 | 39 | 32.0 | 4.0 | 3.00 | 8.01 | 0.00 | 2.67 |
| | 9 | 1 | 1 | 44 | 32.0 | 1.0 | 3.00 | 3.00 | 0.00 | 1.00 |
| | 10 | 1 | 1 | 45 | 32.0 | 1.0 | 0.30 | 7.80 | 0.00 | 26.00 |
| | 11 | 1 | 1 | 46 | 32.0 | 1.0 | 3.00 | 8.01 | 0.00 | 2.67 |
| | 12 | 1 | 6 | 7 | 42.0 | 6.1 | 3.00 | 8.00 | 0.00 | 2.67 |
| | 13 | 1 | 5 | 47 | 40.0 | 5.0 | 3.00 | 8.00 | 0.00 | 2.67 |

TABLE 11

| | | Evaluation results | | |
|---|---|---|---|---|
| | | Inhibition of blurring | Image clarity | Moisture absorption resistance |
| Example | 1 | AA | AA+ | AA |
| | 2 | AA | AA+ | AA |
| | 3 | AA | AA+ | AA |
| | 4 | AA | AA+ | AA |
| | 5 | AA | AA | AA |
| | 6 | AA | AA+ | AA |
| | 7 | AA | AA+ | AA |
| | 8 | AA | AA+ | AA |
| | 9 | AA | AA+ | AA |
| | 10 | AA | A | AA |
| | 11 | AA | B | AA |
| | 12 | AA | B | AA |
| | 13 | AA | A | AA |
| | 14 | A | A | AA |
| | 15 | AA | A | AA |
| | 16 | AA | B | AA |
| | 17 | AA | AA+ | AA |
| | 18 | AA | AA+ | AA |
| | 19 | AA | A | AA |
| | 20 | A | AA+ | AA |
| | 21 | A | AA+ | AA |
| | 22 | A | A | AA |
| | 23 | B | AA+ | AA |
| | 24 | A | AA+ | AA |
| | 25 | A | A | AA |
| | 26 | AA | A | AA |
| | 27 | AA | AA+ | AA |
| | 28 | A | AA+ | AA |
| | 29 | A | AA+ | AA |
| | 30 | AA | B | AA |
| | 31 | AA | A | AA |
| | 32 | A | AA+ | AA |
| | 33 | A | AA+ | AA |
| | 34 | A | AA+ | AA |
| | 35 | A | AA+ | AA |
| | 36 | AA | A | AA |
| | 37 | AA | A | AA |
| | 38 | AA | AA+ | AA |
| | 39 | AA | AA+ | AA |
| | 40 | AA | AA+ | AA |

TABLE 11-continued

| | | Evaluation results | | |
|---|---|---|---|---|
| | | Inhibition of blurring | Image clarity | Moisture absorption resistance |
| | 41 | A | AA+ | AA |
| | 42 | A | AA+ | AA |
| | 43 | A | AA+ | AA |
| | 44 | A | AA++ | AA |
| | 45 | A | AA+ | AA |
| | 46 | AA | AA++ | AA |
| | 47 | AA | A | AA |
| | 48 | AA | B | AA |
| | 49 | AA | AA+ | AA |
| | 50 | AA | AA+ | A |
| | 51 | AA | AA+ | A |
| | 52 | AA | AA+ | AA |
| | 53 | AA | AA+ | A |
| | 54 | AA | AA+ | AA |
| | 55 | A | AA+ | AA |
| | 56 | AA | AA+ | AA |
| | 57 | AA | AA | AA |
| | 58 | AA | AA | AA |
| Comparative Example | 1 | AA | C | AA |
| | 2 | AA | C | AA |
| | 3 | C | A | AA |
| | 4 | AA | C | AA |
| | 5 | AA | C | AA |
| | 6 | C | AA+ | AA |
| | 7 | C | AA+ | AA |
| | 8 | AA | C | AA |
| | 9 | AA | C | AA |
| | 10 | C | AA+ | AA |
| | 11 | AA | AA+ | C |
| | 12 | AA | C | AA |
| | 13 | AA | C | AA |

The image clarity in Example 15 was evaluated as "A", which was the same as that in Example 13, but the image clarity in Example 13 was superior to that in Example 15. In Table 11, the sample rated "AA+" was superior to the sample rated "AA" in the same evaluation.

According to an embodiment of the present invention, it is possible to provide the ink jet recording method by which an image excellent in image clarity and moisture absorption resistance with blurring inhibited can be recorded even when recording is performed on a non-absorbent recording medium. In addition, according to an embodiment of the present invention, it is possible to provide the ink jet recording apparatus used for the ink jet recording method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-187867 filed Nov. 25, 2022, No. 2022-187861 filed Nov. 25, 2022, and No. 2023-190124 filed Nov. 7, 2023, which are hereby incorporated by reference herein in their entirety.

What is claimed is:

1. An ink jet recording method for recording an image on a recording medium with an aqueous ink and an aqueous reaction liquid containing a reactant that reacts with the aqueous ink, the method comprising:
a reaction liquid application step of applying the aqueous reaction liquid to the recording medium; and
an ink application step of applying the aqueous ink in such a manner that the aqueous ink overlaps with at least part of a region of the recording medium to which the aqueous reaction liquid is applied,
wherein the aqueous ink comprises a pigment dispersed by action of a carboxylic acid group, a resin particle and a water-soluble organic solvent,
a rate of increase in particle size of the pigment dispersed by the action of the carboxylic acid group when the pigment comes into contact with the aqueous reaction liquid is 8.0 times or more,
the resin particle comprises a first resin particle having a rate of increase in particle size of 3.0 times or less when the first resin particle comes into contact with the aqueous reaction liquid,
a mass ratio of an amount (% by mass) of the first resin particle contained to a total of an amount (% by mass) of a second resin particle having a rate of increase in particle size of more than 3.0 times when the second resin particle comes into contact with the aqueous reaction liquid and an amount (% by mass) of the pigment dispersed by the action of the carboxylic acid group contained in the aqueous ink is 1.2 times or more to 25.0 times or less,
the water-soluble organic solvent comprises a first water-soluble organic solvent having a vapor pressure of $1.0 \times 10^{-2}$ kPa or more,
a proportion (% by mass) of the first water-soluble organic solvent in the water-soluble organic solvent of the aqueous ink is 50.0% by mass or more, and
an amount of water absorbed by the recording medium from a start of contact to 30 msec$^{1/2}$ in a Bristow method is 10 mL/m$^2$ or less.

2. The ink jet recording method according to claim 1, wherein the reactant in the aqueous reaction liquid comprises an organic acid having a pKa of 3.2 or more at 25° C., and
the first resin particle in the aqueous ink comprises a resin particle dispersed by the action of the carboxylic acid group and has an acid value of 11 mgKOH/g or less.

3. The ink jet recording method according to claim 2, wherein the organic acid has a pKa of 3.5 or more at 25° C.

4. The ink jet recording method according to claim 2, wherein the first resin particle has an acid value of 5 mgKOH/g or less.

5. The ink jet recording method according to claim 1, wherein the reactant in the aqueous reaction liquid comprises a cationic resin, and
the first resin particle in the aqueous ink comprises a resin particle dispersed by action of at least one hydrophilic group selected from the group consisting of a hydroxy group, an ethylene oxide group and a propylene oxide group.

6. The ink jet recording method according to claim 5, wherein the cationic resin has a weight-average molecular weight of 5,000 or less.

7. The ink jet recording method according to claim 5, wherein a degree of cationization (meq/g) of the cationic resin is 3 meq/g or more to 7 meq/g or less.

8. The ink jet recording method according to claim 1, wherein the pigment comprises a pigment dispersed with a resin having a carboxylic acid group.

9. The ink jet recording method according to claim 8, wherein the resin having the carboxylic acid group has an acid value of 100 mgKOH/g or more.

10. The ink jet recording method according to claim 1, wherein the aqueous ink further comprises at least one surfactant selected from the group consisting of a fluorine-based nonionic surfactant and a silicone-based nonionic surfactant.

11. The ink jet recording method according to claim 10, wherein the aqueous ink further comprises a hydrocarbon-based nonionic surfactant.

12. The ink jet recording method according to claim 11, wherein the silicone-based nonionic surfactant in the aqueous ink comprises a compound having a structure in which a silicon atom at a position other than a terminal of a polyorganosiloxane chain having a siloxane repeating structure as a main skeleton is substituted with at least one hydrophilic group selected from the group consisting of an alkylene oxide group and a hydroxy group, and the hydrocarbon-based nonionic surfactant in the aqueous ink comprises a compound having a structure in which a carbon atom at a position other than a terminal of a hydrocarbon chain as a main skeleton is substituted with at least one hydrophilic group selected from the group consisting of an alkylene oxide group and a hydroxy group.

13. The ink jet recording method according to claim 1, wherein the mass ratio of the amount (% by mass) of the first resin particle contained to the total of the amount (%) by mass) of the second resin particle and the amount (% by mass) of the pigment in the aqueous ink is 1.5 times or more to 6.0 times or less.

14. The ink jet recording method according to claim 1, wherein the resin particle in the aqueous ink comprises an anionic group selected from the group consisting of a sulfonic acid group, a sulfate group and a phosphonic acid group.

15. The ink jet recording method according to claim 1, wherein the first resin particle has a rate of increase in particle size of 1.2 times or less.

16. The ink jet recording method according to claim 1, wherein the proportion (% by mass) of the first water-soluble organic solvent in the water-soluble organic solvent of the aqueous ink is 90.0% by mass or more.

17. The ink jet recording method according to claim 1, wherein an amount (% by mass) of a resin particle in the aqueous reaction liquid is 1.0% by mass or less based on a total mass of the reaction liquid.

18. The ink jet recording method according to claim 1, wherein the reactant in the aqueous reaction liquid comprises an organic acid, and the first resin particle in the aqueous ink comprises a resin particle dispersed by action of at least one hydrophilic group selected from the group consisting of a hydroxy group, an ethylene oxide group, a propylene oxide group, a sulfonic acid group, a sulfate group and a phosphonic acid group.

19. The ink jet recording method according to claim 18, wherein the organic acid comprises a polyvalent carboxylic acid.

20. The ink jet recording method according to claim 1, wherein the reactant in the aqueous reaction liquid comprises a polyvalent metal salt, and the first resin particle in the aqueous ink comprises a resin particle dispersed by action of at least one hydrophilic group selected from the group consisting of a hydroxy group, an ethylene oxide group, a propylene oxide group, a sulfonic acid group, a sulfate group and a phosphonic acid group.

21. The ink jet recording method according to claim 20, wherein the polyvalent metal salt comprises at least one compound selected from the group consisting of calcium lactate and magnesium sulfate.

22. The ink jet recording method according to claim 1, wherein the aqueous reaction liquid further comprises a second water-soluble organic solvent having a vapor pressure of $1.0 \times 10^{-2}$ kPa or more, and a proportion (% by mass) of the second water-soluble organic solvent in the water-soluble organic solvent of the aqueous reaction liquid is 90.0% by mass or more.

23. The ink jet recording method according to claim 1, wherein the aqueous ink further comprises a water-soluble resin, the water-soluble resin comprises at least one selected from the group consisting of (i) a water-soluble resin containing a unit having at least one selected from the group consisting of an ethylene oxide group and a propylene oxide group and (ii) a block copolymer containing a block formed of an acid group-free unit, and an amount (% by mass) of the water-soluble resin in the aqueous ink is 0.1% by mass or more based on a total mass of the ink.

24. An ink jet recording apparatus used for recording an image on a recording medium with an aqueous ink and an aqueous reaction liquid containing a reactant that reacts with the aqueous ink, comprising:

a reaction liquid application unit configured to apply the aqueous reaction liquid to the recording medium; and an ink application unit configured to apply the aqueous ink in such a manner that the aqueous ink overlaps with at least part of a region of the recording medium to which the aqueous reaction liquid is applied, wherein the aqueous ink comprises a pigment dispersed by action of a carboxylic acid group, a resin particle and a water-soluble organic solvent, a rate of increase in particle size of the pigment dispersed by the action of the carboxylic acid group when the pigment comes into contact with the aqueous reaction liquid is 8.0 times or more, the resin particle comprises a first resin particle having a rate of increase in particle size of 3.0 times or less when the first resin particle comes into contact with the aqueous reaction liquid, a mass ratio of an amount (% by mass) of the first resin particle contained to a total of an amount (% by mass) of a second resin particle having a rate of increase in particle size of more than 3.0 times when the second resin particle comes into contact with the aqueous reaction liquid and an amount (% by mass) of the pigment dispersed by the action of the carboxylic acid group contained in the aqueous ink is 1.2 times or more to 25.0 times or less, the water-soluble organic solvent comprises a first water-soluble organic solvent having a vapor pressure of $1.0 \times 10^{-2}$ kPa or more, a proportion (% by mass) of the first water-soluble organic solvent in the water-soluble organic solvent of the aqueous ink is 50.0% by mass or more, and an amount of water absorbed by the recording medium from a start of contact to 30 msec$^{1/2}$ in a Bristow method is 10 mL/m$^2$ or less.

\* \* \* \* \*